US012665543B2

(12) United States Patent
de Fresart et al.

(10) Patent No.: US 12,665,543 B2
(45) Date of Patent: Jun. 23, 2026

(54) SYSTEMS AND DEVICES FOR SECURING A PHOTOVOLTAIC MODULE TO A MOUNTING RAIL

(71) Applicant: ARRAY TECH, INC., Albuquerque, NM (US)

(72) Inventors: Benjamin de Fresart, Chandler, AZ (US); Nathan Schuknecht, Golden, CO (US); Shuo Chen, Chandler, AZ (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 19/047,922

(22) Filed: Feb. 7, 2025

(65) Prior Publication Data

US 2025/0253803 A1     Aug. 7, 2025

Related U.S. Application Data

(60) Provisional application No. 63/652,445, filed on May 28, 2024, provisional application No. 63/550,750, filed on Feb. 7, 2024.

(51) Int. Cl.
H02S 30/10          (2014.01)
(52) U.S. Cl.
CPC .................................. H02S 30/10 (2014.12)
(58) Field of Classification Search
CPC ........... H02S 30/10; H02S 20/30; H02S 20/32
See application file for complete search history.

(56) References Cited

U.S. PATENT DOCUMENTS

| | | | |
|---|---|---|---|
| 6,405,494 B1 | 6/2002 | Wismeth | |
| 8,382,513 B2 | 2/2013 | Kobayashi | |

| | | | |
|---|---|---|---|
| 8,418,688 B2 | 4/2013 | King et al. | |
| 8,443,558 B2 | 5/2013 | Buller et al. | |
| 8,567,154 B2 | 10/2013 | Babineau, Jr. et al. | |
| 8,590,222 B2 | 11/2013 | Koller | |

(Continued)

FOREIGN PATENT DOCUMENTS

| | | |
|---|---|---|
| CN | 202282361 | 6/2012 |
| CN | 202977452 | 6/2013 |

(Continued)

OTHER PUBLICATIONS

European Patent Office; International Search Report and Written Opinion issued in PCT App No. PCT/US2025/014940 dated May 12, 2025.

*Primary Examiner* — Jayne L Mershon

(74) *Attorney, Agent, or Firm* — MASCHOFF BRENNAN

(57)          ABSTRACT

A clip for attaching a frame rail to a mounting rail in a photovoltaic (PV) module system may include a first arm and a second arm, both with proximal and distal ends, and a connecting body that connects the proximal ends of the first arm and second arm. The first arm includes a first retention recess that may be configured to interface with a first clip retention tab and the second arm includes a second retention recess that may be configured to interface with a second clip retention tab. The first arm, the second arm, and the connecting body define a slot that may be configured to receive a mounting rail flange and a frame rail flange. One or more of the first arm, the second arm, or the connecting body may be configured to elastically deform to apply a spring force when the clip is in a compressed state.

12 Claims, 28 Drawing Sheets

(56) References Cited

U.S. PATENT DOCUMENTS

| | | | |
|---|---|---|---|
| 8,590,223 | B2 | 11/2013 | Kilgore et al. |
| 8,713,881 | B2 | 5/2014 | DuPont et al. |
| 8,875,394 | B2 | 11/2014 | Li et al. |
| 8,894,033 | B2 | 11/2014 | Hartelius et al. |
| 8,894,424 | B2 | 11/2014 | DuPont |
| 8,955,259 | B2 | 2/2015 | Hemingway |
| 8,984,818 | B2 | 3/2015 | McPheeters et al. |
| 9,299,870 | B2 | 3/2016 | Kuan |
| 9,314,904 | B2 | 4/2016 | Veloso et al. |
| 9,331,629 | B2 | 5/2016 | Cheung et al. |
| 9,705,447 | B2 | 7/2017 | Cavieres et al. |
| 9,748,892 | B2 | 8/2017 | Almy et al. |
| 9,923,509 | B2 | 3/2018 | Almy |
| 9,941,835 | B2 | 4/2018 | Molina et al. |
| 9,970,685 | B2 | 5/2018 | Smidt et al. |
| 10,027,273 | B2 | 7/2018 | West et al. |
| 10,141,662 | B2 | 11/2018 | Bernard et al. |
| 10,158,323 | B2 | 12/2018 | Schulte et al. |
| 10,171,027 | B2 | 1/2019 | Wares et al. |
| 10,187,006 | B2 | 1/2019 | Almy et al. |
| 10,202,995 | B2 | 2/2019 | Stickelberger et al. |
| 10,240,820 | B2 | 3/2019 | Ash et al. |
| 10,345,009 | B2 | 7/2019 | Chevrier et al. |
| 10,469,024 | B2 | 11/2019 | Almy et al. |
| 10,505,492 | B2 | 12/2019 | Hudson et al. |
| 10,530,293 | B2 | 1/2020 | Legall et al. |
| 10,587,220 | B2 | 3/2020 | De Vogel et al. |
| 10,622,937 | B2 | 4/2020 | Pesce et al. |
| 10,731,897 | B1 | 8/2020 | Cherukupalli et al. |
| 10,801,538 | B2 | 10/2020 | Legall et al. |
| 10,852,038 | B2 | 12/2020 | Rothschild |
| 11,552,590 | B2 | 1/2023 | Cavieres Pinilla |
| 11,689,152 | B2 | 6/2023 | de Fresart |
| 2008/0310913 | A1 | 12/2008 | Urban et al. |
| 2011/0147553 | A1 | 6/2011 | Ostermeier et al. |
| 2011/0272372 | A1 | 11/2011 | Ostermeier et al. |
| 2012/0205508 | A1 | 8/2012 | Cusson et al. |
| 2013/0009786 | A1 | 1/2013 | Mosesov |
| 2013/0102165 | A1 | 4/2013 | DuPont |
| 2013/0193301 | A1 | 8/2013 | Jackson et al. |
| 2014/0026946 | A1 | 1/2014 | West et al. |
| 2014/0220834 | A1 | 8/2014 | Rizzo |
| 2016/0282018 | A1 | 9/2016 | Ash et al. |
| 2017/0057430 | A1 | 3/2017 | Kim |
| 2017/0346438 | A1 | 11/2017 | Cavieres et al. |
| 2018/0062568 | A1 | 3/2018 | Schulte et al. |
| 2018/0191289 | A1 | 7/2018 | Zhu |
| 2018/0226918 | A1 | 8/2018 | De Vogel et al. |
| 2019/0186518 | A1* | 6/2019 | Legall .................. F24S 25/632 |
| 2019/0222169 | A1 | 7/2019 | Yang et al. |
| 2020/0363007 | A1 | 11/2020 | Daniels |
| 2021/0034863 | A1 | 2/2021 | Sudkamp et al. |
| 2021/0348633 | A1 | 11/2021 | Friedrich et al. |
| 2022/0029579 | A1 | 1/2022 | Cavieres Pinilla |
| 2022/0060006 | A1 | 2/2022 | Naugler |
| 2022/0085752 | A1* | 3/2022 | de Fresart .............. H02S 30/10 |
| 2022/0407451 | A1 | 12/2022 | Jacobs |
| 2023/0336115 | A1 | 10/2023 | de Fresart |
| 2025/0067290 | A1* | 2/2025 | Maddulapalli ........ F24S 25/634 |
| 2025/0175115 | A1 | 5/2025 | Stephan |

FOREIGN PATENT DOCUMENTS

| | | |
|---|---|---|
| CN | 203367303 | 12/2013 |
| CN | 204498061 | 7/2015 |
| CN | 106196660 | 12/2016 |
| CN | 206092592 | 4/2017 |
| CN | 207766212 | 8/2018 |
| CN | 108712141 | 10/2018 |
| CN | 208797870 | 4/2019 |
| CN | 110401408 | 11/2019 |
| CN | 209579381 | 11/2019 |
| CN | 110855220 | 2/2020 |
| CN | 210053376 | 2/2020 |
| CN | 210120526 | 2/2020 |
| CN | 111023592 | 4/2020 |
| CN | 111192933 | 5/2020 |
| CN | 111200392 | 5/2020 |
| CN | 210490766 | 5/2020 |
| CN | 210536548 | 5/2020 |
| CN | 210536576 | 5/2020 |
| CN | 211046866 | 7/2020 |
| CN | 211183814 | 8/2020 |
| CN | 211606449 | 9/2020 |
| CN | 211670199 | 10/2020 |
| CN | 212183450 | 12/2020 |
| CN | 212200954 | 12/2020 |
| CN | 212200955 | 12/2020 |
| CN | 212390636 | 1/2021 |
| CN | 114499364 A | 5/2022 |
| CN | 217183240 U | 8/2022 |
| DE | 202008009241 | 11/2009 |
| DE | 102008026498 | 12/2009 |
| DE | 202010001854 | 9/2010 |
| DE | 202011003534 | 5/2011 |
| DE | 102010022556 | 6/2011 |
| DE | 102010007016 | 8/2011 |
| DE | 202012005504 | 6/2012 |
| DE | 102010020196 | 7/2012 |
| DE | 102012213734 | 2/2014 |
| DE | 102013009944 | 12/2014 |
| DE | 202016004510 | 9/2016 |
| DE | 102011013147 | 7/2020 |
| EP | 2447621 | 5/2012 |
| EP | 2867541 | 5/2015 |
| EP | 2714805 | 7/2015 |
| EP | 2528166 | 9/2015 |
| EP | 2187146 | 1/2019 |
| EP | 2746696 | 2/2019 |
| EP | 3306011 | 9/2020 |
| EP | 3767200 | 1/2021 |
| FR | 3074369 | 12/2019 |
| FR | 3093772 | 9/2020 |
| JP | 5395304 | 1/2014 |
| JP | 5555085 | 7/2014 |
| JP | 5897977 | 4/2016 |
| JP | 2016052163 | 4/2016 |
| JP | 2016073037 | 5/2016 |
| JP | 6554427 | 7/2019 |
| KR | 101034223 | 5/2011 |
| KR | 20150096984 | 8/2015 |
| KR | 101562850 | 10/2015 |
| KR | 101931281 | 12/2018 |
| KR | 20200009934 | 1/2020 |
| KR | 102172302 | 10/2020 |
| RU | 2313852 | 12/2007 |
| WO | 2313852 | 12/2007 |
| WO | 2014/169396 | 10/2014 |
| WO | 2016/189182 | 12/2016 |
| WO | 2017/013241 | 1/2017 |
| WO | 2020/021178 | 1/2020 |
| WO | 2020/076870 | 4/2020 |
| WO | 2020/162746 | 8/2020 |
| WO | 2020/229307 | 11/2020 |
| WO | 2020/231254 | 11/2020 |
| WO | 2022/035755 | 2/2022 |
| WO | 2022189751 A1 | 9/2022 |
| WO | 2023235349 A1 | 12/2023 |
| WO | 2024062271 A1 | 3/2024 |

* cited by examiner

SYSTEMS AND DEVICES FOR SECURING A PHOTOVOLTAIC MODULE TO A MOUNTING RAIL

CROSS-REFERENCE TO RELATED APPLICATIONS

The present application claims priority to and the benefit of U.S. Provisional Patent Application Ser. No. 63/550,750, entitled SYSTEM FOR SECURING A PHOTOVOLTAIC MODULE TO A MOUNTING RAIL, which was filed on Feb. 7, 2024, and is hereby incorporated by reference in its entirety.

The present application claims priority to and the benefit of U.S. Provisional Patent Application Ser. No. 63/652,445, entitled AN APPARATUS FOR SECURING A PHOTO-VOLTAIC MODULE TO A MOUNTING RAIL, which was filed on May 28, 2024, and is hereby incorporated by reference in its entirety.

BACKGROUND

Installation of photovoltaic (PV) modules often requires a PV module frame to be secured to an underlying mounting rail, which is then mounted on a torque tube or other support structure. A number of different mechanisms may be used to secure a PV module frame to a mounting rail. For example, threaded fasteners such as bolts may be inserted through one or more holes in the PV module frame and mounting rail. This, however, is time and labor intensive as it often requires physical manipulation of multiple parts, tightening bolts and nuts to a specific torque, and/or quality control checks that must be done on torqued fasteners as part of the installation process.

To avoid the time and labor that threaded fasteners require, clip products that reduce installation time and labor are sometimes used to secure a PV module frame to a mounting rail. However, existing clip solutions often allow the PV module to move or slide relative to the mounting rail, especially when the PV module is under a heavy load, which may be caused by environmental factors such as snow accumulation, wind, and seismic activities. In addition to movement between the PV module and the mounting rail, the clips themselves are also susceptible to movement relative to one or both of the PV module and mounting rail. For example, clips may twist to one side of the clip or the other, slip relative to the PV module and/or mounting rail and, in some instances, the clips may detach from the PV module and mounting rail altogether.

In addition, existing clip solutions may be difficult to install and may twist and turn based on the installation technique and the method used to hold the PV module and mounting rail together. The difficulty and movement in installation may lead to inconsistent results and improperly installed clips which may lead to damaged PV modules and support structures. For example, existing clips may attach to the PV module and mounting rail more on one side of the clip which leads to twisting of the clip relative to the PV module and/or mounting rail. In some instances, the clip twisting more on one side than the other may lead to inefficient installation or inadequate connection between the PV module frame and the mounting rail.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address problems experienced in conventional solar panel tracking systems, including problems associated with the use of clips to secure a PV module to a mounting rail. Embodiments disclosed herein address these issues by providing a mounting rail that includes a module locating feature, which ensures that a PV module is properly positioned on the mounting rail. The mounting rail may also include one or more clip retention tabs that ensure that a clip used to secure a PV module to a mounting rail remains in place on the mounting rail. In addition, embodiments disclosed herein may include a clip designed to interface with the clip retention tabs while engaging with the PV module and the mounting rail, thereby holding the two (the PV module and the mounting rail) in place relative to each other. The combination of the mounting rail that includes the module locating feature and the clip results in limiting both the translational and axial movement of the PV module and mounting rail relative to each other.

Some embodiments described herein include a system for PV module installation. The system may include a mounting rail including a mounting rail flange having an upper surface that is configured to interface with a bottom surface of a frame rail flange, and a first clip retention tab and a second clip retention tab extending from a side surface of the mounting rail flange. The system for PV module installation additionally includes a clip configured to attach to the mounting rail flange and the frame rail flange to one another. In some embodiments, the clip includes a first arm, a second arm, and a connecting body. The first arm includes a proximal end, a distal end, and a first retention recess that is configured to interface with a first clip retention tab. The second arm includes a proximal end, a distal end, and a second retention recess that is configured to interface with a second clip retention tab. The connecting body connects the proximal end of the first arm with the proximal end of the second arm. In some embodiments, the first arm, the second arm, and the connecting body define a slot configured to receive a mounting rail flange and a frame rail flange. In addition, one or more of the first arm, the second arm, or the connecting body is configured to elastically deform to decrease a distance between the distal end of the first arm and the distal end of the second arm relative to each other and apply a spring force to the first arm and the second arm away from a longitudinal axis of the clip when the clip is in a compressed state.

In another embodiment, a system for PV module installation includes a mounting rail including a mounting rail flange having an upper surface that is configured to interface with a bottom surface of a frame rail flange and a lower surface having a clip retaining feature, the clip retaining feature including a longitudinal clip retention protrusion and a lateral clip retention protrusion. The system additionally includes a clip having a first arm, a second arm, a body that connects the first arm to the second arm, and a retention tab at an end of the first arm. The first and second arms define a slot that is configured to receive the mounting rail flange and a frame rail flange. In some embodiments, the clip may have an installed state where the retention tab interfaces with the longitudinal clip retention protrusion to prevent the clip from slipping longitudinally relative to the mounting rail flange, and at least one of the first and second arms interface with the lateral clip retention protrusion to prevent the clip from slipping laterally relative to the mounting rail flange. In some embodiments, the body may allow the first and second arms some flexibility such that a width of the slot may increase to allow the retention tab to slide over the longitudinal clip retention protrusion during installation. In some embodiments, the longitudinal clip retention protrusion includes a ramp and ridge shape. In some embodiments, the clip retaining feature also includes a longitudinal clip retention recess that is configured to interface with the retention tab. In some embodiments, the longitudinal clip retention protrusion is configured to interface with an exterior surface of a wall on the clip. In some embodiments, the longitudinal clip retention protrusion is configured to interface with an interior surface of a wall on the clip.

In some embodiments, the system may additionally include a module locating feature. The module locating feature may protrude from the upper surface of the mounting rail flange and has a shape that is configured to fit within an aperture in the bottom surface of the frame rail flange. The module locating feature is configured to properly position the PV module frame on the upper surface of the mounting rail and prevent the frame rail flange from slipping relative to the mounting rail flange. In some instances, the module locating feature is circular, in others, the module locating feature is ovular or some other shape. In some embodiments, a height of the module locating feature is approximately equal to or greater than a thickness of the frame rail flange. In some instances, the module locating feature is positioned between first and second longitudinal clip retention protrusions.

Some embodiments described herein include a mounting rail. In some embodiments, the mounting rail includes a mounting rail flange having an upper surface that is configured to interface with a bottom surface of a frame rail flange and a module locating feature that protrudes from the upper surface of the mounting rail flange and has a shape that is configured to fit within an aperture in the frame rail flange. The mounting rail may additionally include a first clip retention tab and a second clip retention tab extending from a side surface of the frame rail flange, the first clip retention tab and the second clip retention tab configured to interface with one or more clip retaining interfaces of a clip configured to receive the mounting rail flange and the frame rail flange. In some embodiments, a height corresponding to the module locating feature is approximately equal to or greater than a thickness of the frame rail flange. In some embodiments, the first clip retention tab and the second clip retention tab are configured to decrease lateral slipping of the clip relative to the frame fail flange. In some embodiments, the first clip retention tab and the second clip retention tab extend along a length of the mounting rail flange except a portion of the mounting rail flange between the first clip retention tab and the second clip retention tab.

In some embodiments, a mounting rail includes a mounting rail flange having an upper surface that is configured to interface with a bottom surface of a frame rail flange and a module locating feature that protrudes or extends from the upper surface of the mounting rail flange and has a shape that is configured to fit within an aperture in the frame rail flange. Further, the module locating feature may be designed or configured to properly position the frame rail flange on the upper surface of the mounting rail and prevent the frame rail flange from slipping relative to the mounting rail flange. In some embodiments, the module locating feature may be circular, in others, it may be shaped as an oval or other shape. In some embodiments, a height associated with the module locating feature is approximately equal to or greater than a thickness of the frame rail flange.

In another embodiment, the mounting rail may include a mounting rail flange having an upper surface that is configured to interface with a bottom surface of a frame rail flange and a lower surface having a clip retaining feature, the clip retaining feature including a longitudinal clip retention protrusion and a lateral clip retention protrusion. The longitudinal clip retention protrusion is configured to prevent a clip from slipping longitudinally relative to the mounting rail flange. The lateral clip retention protrusion is configured to prevent the clip from slipping laterally relative to the mounting rail flange. In some embodiments, the longitudinal clip retention protrusion includes a ramp and ridge shape. In some embodiments, the clip retaining feature also includes a longitudinal clip retention recess that is configured to interface with a retention tab on a clip. Additionally or alternatively, the longitudinal clip retention protrusion is configured to interface with an interior surface of a clip wall.

Some embodiments described herein include a clip for attaching a frame rail to a mounting rail in a PV module system. In some embodiments, the clip includes a first arm, a second arm, and a connecting body. The first arm includes a proximal end and a distal end, the first arm including a first retention recess that is configured to interface with a first clip retention tab. The second arm including a proximal end and a distal end. The connecting body connects the proximal end of the first arm with the proximal end of the second arm. In some instances, the first arm, the second arm, and the connecting body define a slot configured to receive a mounting rail flange and a frame rail flange. In addition, one or more of the first arm, the second arm, or the connecting body is configured to elastically deform to decrease a distance between the distal end of the first arm and the distal end of the second arm relative to each other and apply a spring force to the first arm and the second arm away from a longitudinal axis of the clip when the clip is in a compressed state.

In some embodiments, the clip includes a first slot portion defined by the first arm which includes a first center line and a second slot portion defined by the second arm which includes a second center line. The first center line extending from the connecting body at an angle ($\beta$) relative to the second center line extending from the connecting body to allow the clip, in an engaged state, to provide a spring force to the mounting rail flange and the frame rail flange. In some embodiments, the angle beta ($\beta$) is determined based on a combined thickness of the mounting rail flange and the frame rail flange. In some embodiments, a first distance between the first retention recess and the second retention recess is greater than a second distance between the first clip retention tab and the second clip retention tab.

In some embodiments, the slot at the connecting body includes a portion that is larger than the slot defined on either the first arm or the second arm, the larger portion of the slot is configured to allow the clip to be positioned for installation. In some embodiments, the slot on the first arm extends partially into the first retention recess and the slot on the second arm extends partially into the second retention recess. In some embodiments, the distal ends of the first arm and the second arm respectively turn outward relative to each other. In some embodiments, the second arm further includes a second retention recess that is configured to interface with a second clip retention tab.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the accompanying drawings in which.

all in accordance with one or more embodiments in the present disclosure.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
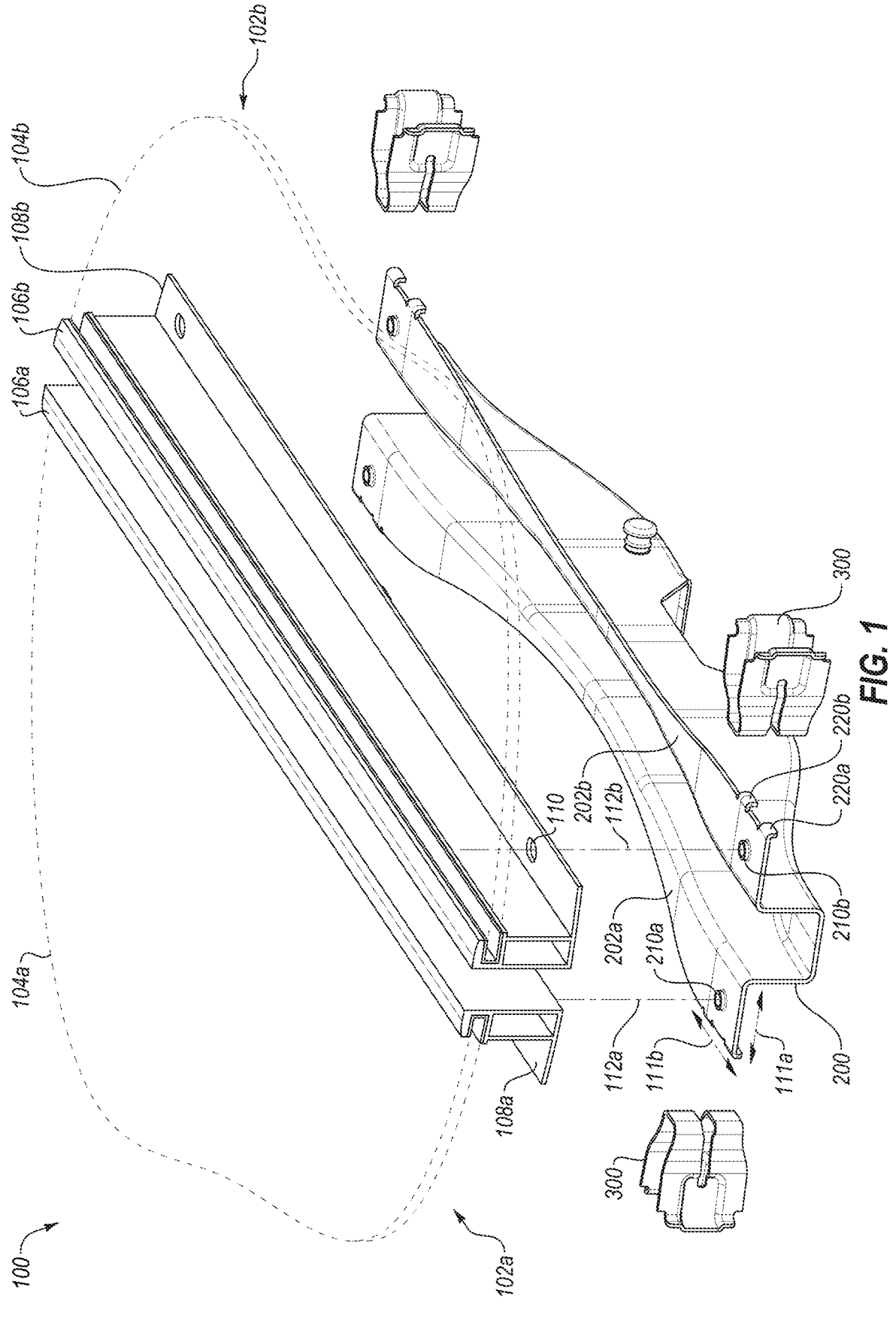
FIG. 1 illustrates an exemplary system for securing PV modules to a mounting rail.

FIG. 1 illustrates an exemplary system 100 for securing PV modules 102a and 102b to a mounting rail 200 using clips 300. The first PV module 102a includes a first solar panel 104a and a first frame 106a that is secured to an edge of the first solar panel 104a. The first frame 106a includes a first frame rail flange 108a that lies on a plane that is generally parallel to the plane on which the first solar panel 104a lies. The second PV module 102b includes a second solar panel 104b and a second frame 106b that is secured to an edge of the second solar panel 104b. The second frame 106b includes a second frame rail flange 108b that lies on a plane that is generally parallel to the plane on which the second solar panel 104b lies. The second frame rail flange 108b also includes an aperture 110 (the first and second frame rail flanges 108a and 108b may be referred to generally as "frame rail flange 108"). While the aperture 110 is shown having an oval shape, the aperture 110 may have any size and shape and may be positioned anywhere on the second frame rail flange 108b. In some embodiments, the aperture 110 may have a circular or polygonal shape. While not shown in FIG. 1, the first frame flange 108a may also include an aperture that is consistent in size, shape, and position with the aperture 110. In some embodiments, the aperture 110 corresponding to the first frame rail flange 108a may be different in size, shape, or position as compared with the aperture 110 corresponding to the second frame rail flange 108b. In some embodiments, the first frame rail flange 108a and/or the second frame rail flange 108b may include more than one aperture that may be analogous to the aperture 110, where the aperture(s) may be located in various positions along the first frame rail flange 108a and/or the second frame rail flange 108b.

The mounting rail 200 includes one or more mounting rail flanges 202—e.g., a first and second mounting rail flange 202a and 202b. An upper surface of the first mounting rail flange 202a is configured to interface with a bottom surface of the first frame rail flange 108a to support the first PV module 102a. The first and second mounting rail flanges 202a and 202b include module locating features 210—e.g., the first module locating feature 210a and the second module locating feature 210b. The first and second module locating features 210a and 210b comprise protrusions that extend from the upper surface of the first and second mounting rail flanges 202a and 202b. The shapes of these protrusions may be configured to fit within the apertures 110 of the first and second frame rail flanges 108a and 108b such that during an installation procedure, the module locating features 210 may fit within the apertures 110. This may be accomplished by lowering the first and second PV modules 102a and 102b down onto the mounting rail 200 or raising the mounting rail 200 up as shown by the dashed lines 112a and 112b.

The module locating features 210 may have any height. In some embodiments, the height of the first and second module locating features 210a and 210b may be approximately equal to the thickness of the first frame rail flange 108a or the second frame rail flange 108b. In some embodiments, the number, size, and position of the module locating features 210 may be consistent with the number, size, and position of corresponding apertures 110, such as the aperture 110 located on the second frame rail flange 108b. When the module locating features 210 are properly positioned within corresponding apertures 110, any lateral (shown by arrow 111a) or longitudinal (shown by arrow 111b) slippage between the first and second PV modules 102a and 102b and the mounting rail 200 may be reduced or eliminated.

The first and second mounting rail flanges 202a and 202b also include clip retention tabs 220 (e.g., a first clip retention tab 220a and a second clip retention tab 220b). The first and second clip retention tabs 220a and 220b include protrusions that extend from a side surface of the first and second mounting rail flanges 202a and 202b. In some embodiments, the first and second clip retention tabs 220a and 220b may be configured to engage with one or more portions of the clip 300. In some embodiments, the first and second clip retention tabs 220a and 220b may be configured to secure the clip 300 to the PV module rail and/or the mounting rail 200. As provided in more detail hereafter, the clip retention tabs 220a and 220b prevent or limit the clip 300 from slipping relative to the mounting rail 200 after installation. Stated differently, the clip retention tabs 220a and 220b secure the clip 300 in place to enable the connection between the first and second PV modules 102a and 102b to the mounting rail 200.

Thus, in FIG. 1, the clip or clips 300 secure the first and second PV modules 102*a* and 102*b* to the mounting rail 200, the module locating features 210 together with corresponding apertures 110 ensure that the first and second PV modules 102*a* and 102*b* are aligned properly on the mounting rail 200 and do not slip, or limit an amount that the mounting rail 200 and the first and second PV modules 102*a* and 102*b* slip, relative to each other. In addition, the first and second clip retention tabs 220*a* and 220*b* decrease or limit an amount that the clip or clips 300 slip or disengage from their positions securing the first and second PV modules 102*a* and 102*b* to the mounting rail 200.

Modifications, additions, or omissions may be made to the system 100 without departing from the scope of the disclosure. For example, another system for securing PV modules to a mounting rail, a PV module may lack a flange but may include another structure that may be used to secure the PV module to a mounting rail. In some embodiments, the clip 300 may not be secured using one or more clip retention tabs 220. In some embodiments, the clip 300 may be held in place by the compression force applied by the clip to the mounting rail flange 202 and/or the frame rail flange 108. In addition, the designations of different elements in the manner described is meant to help explain concepts described herein and is not limiting. Further, the system 100 may include any number of other elements or may be implemented within other systems or contexts than those described.

Figure 2A:
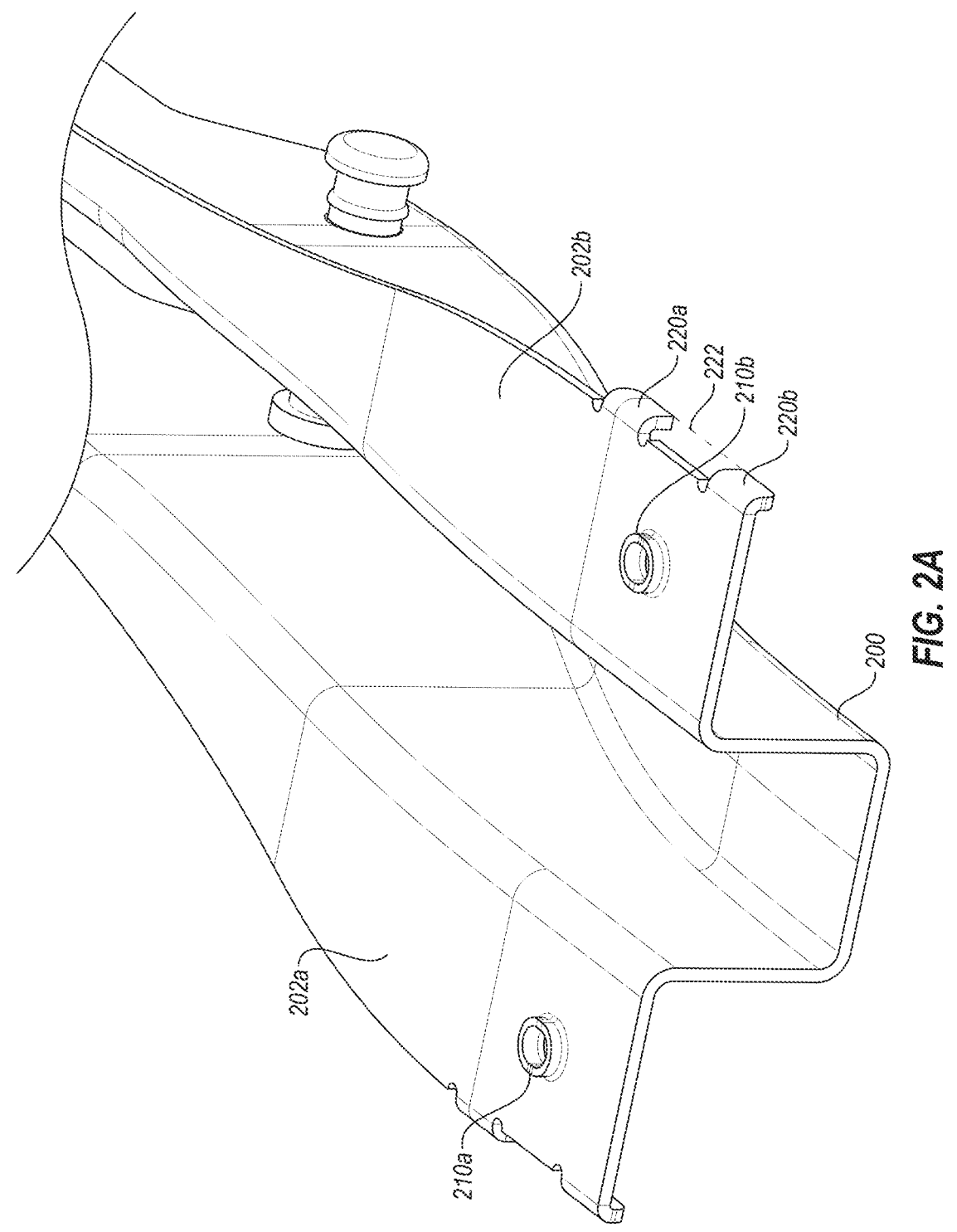
FIGS. 2A-2I illustrate various views of the PV modules and mounting rail shown in FIG. 1.
Figure 2B:
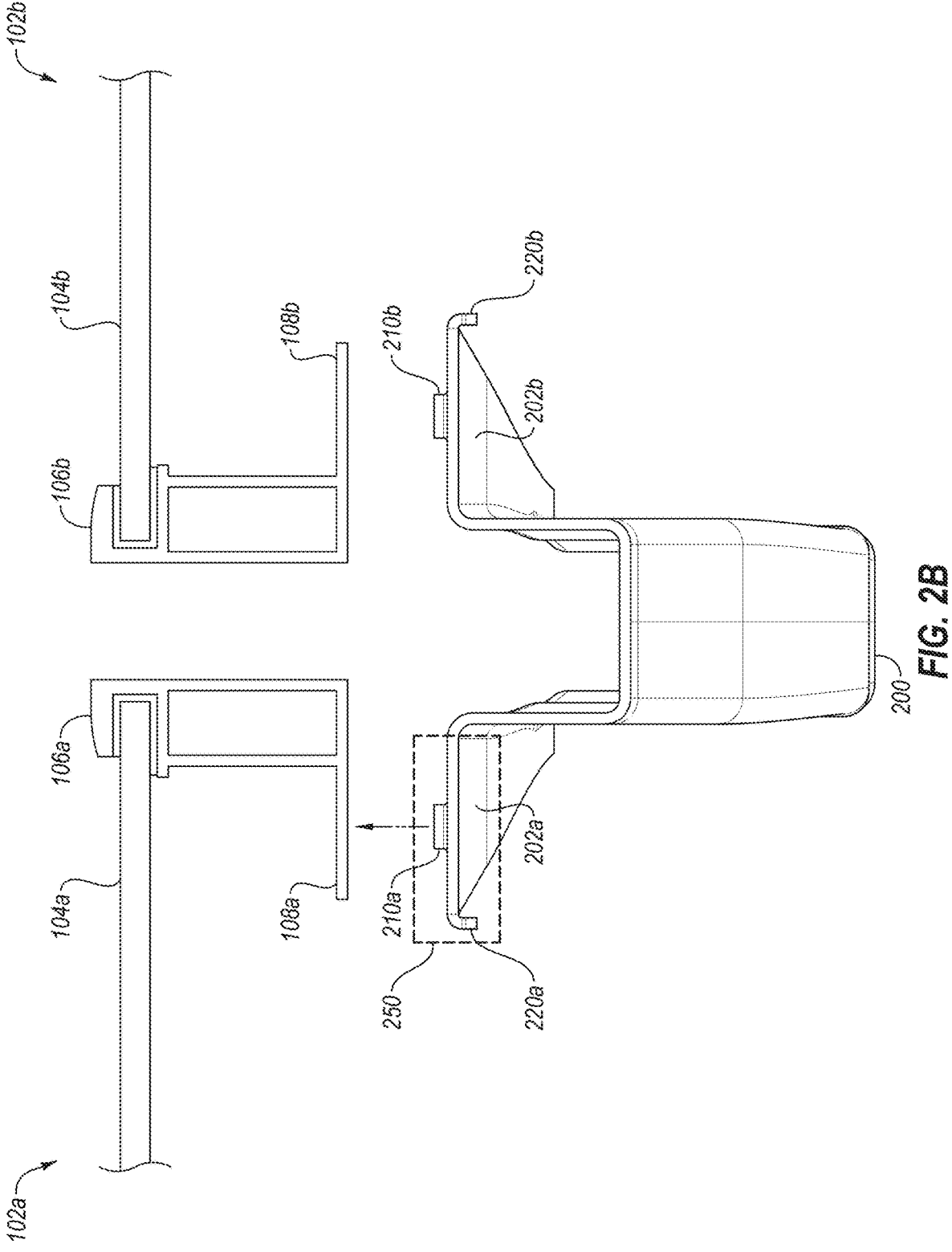
Figures 2C, 2D:
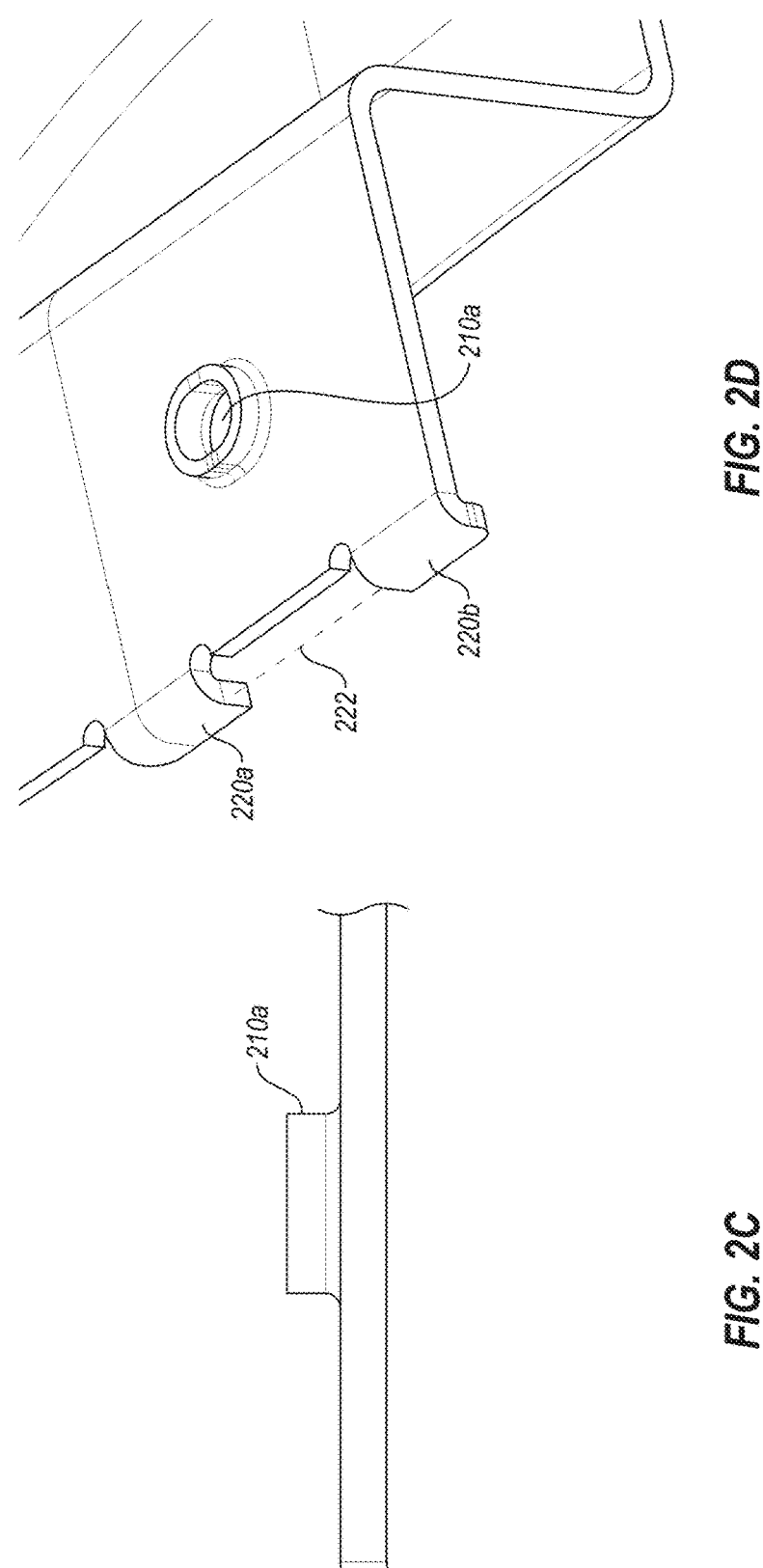
Figures 2E, 2F:
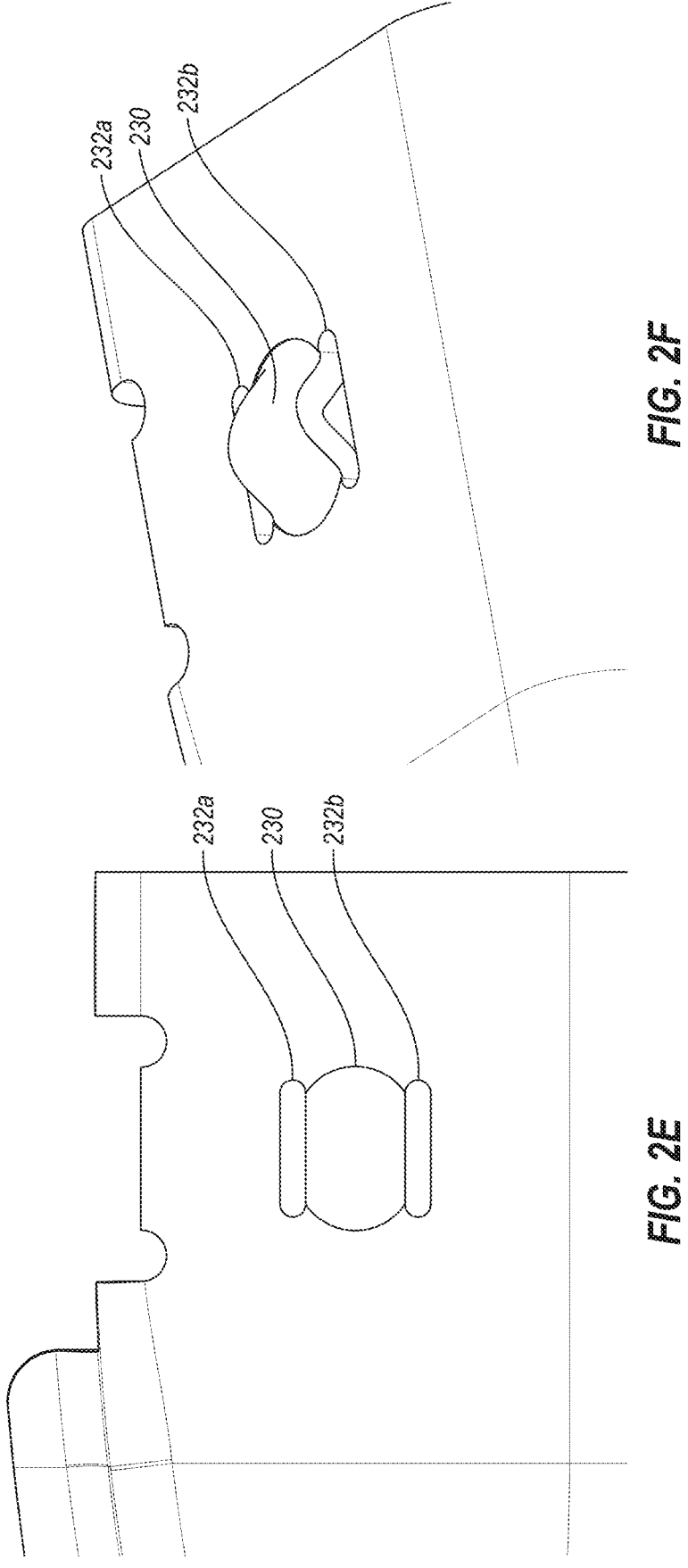
Figures 2G, 2H:
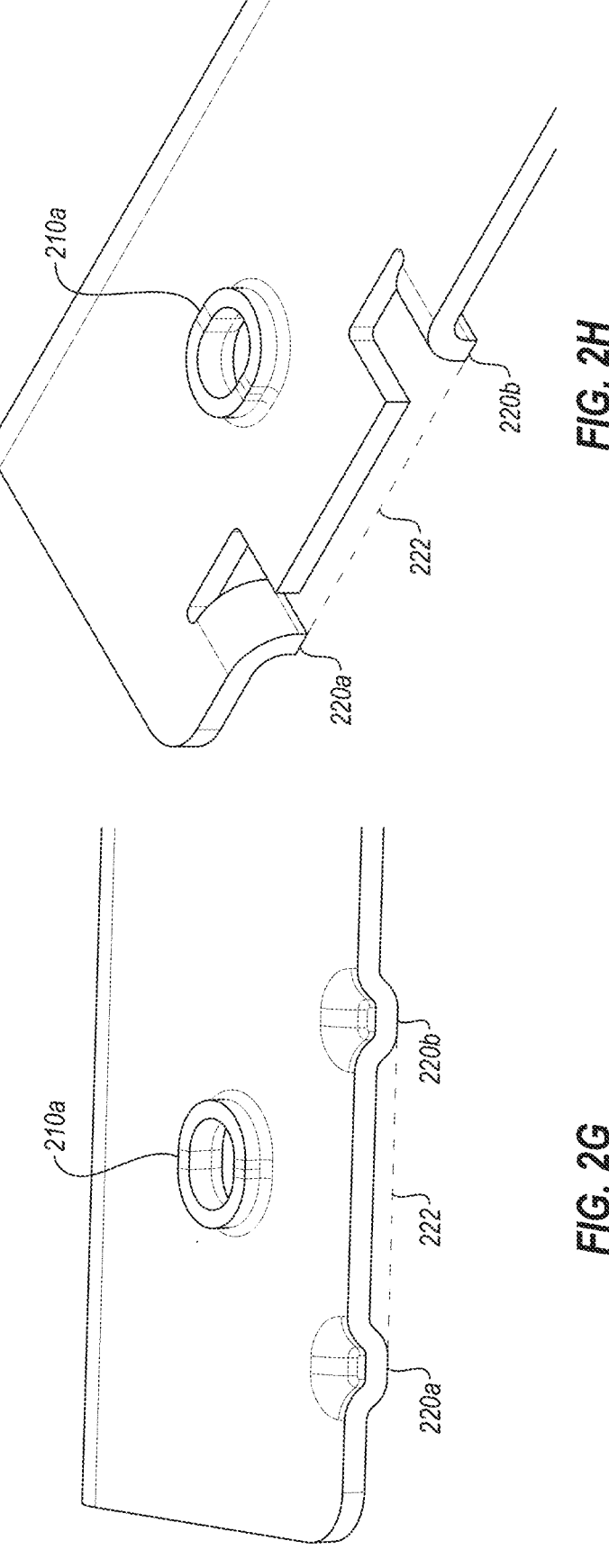
Figure 2I:
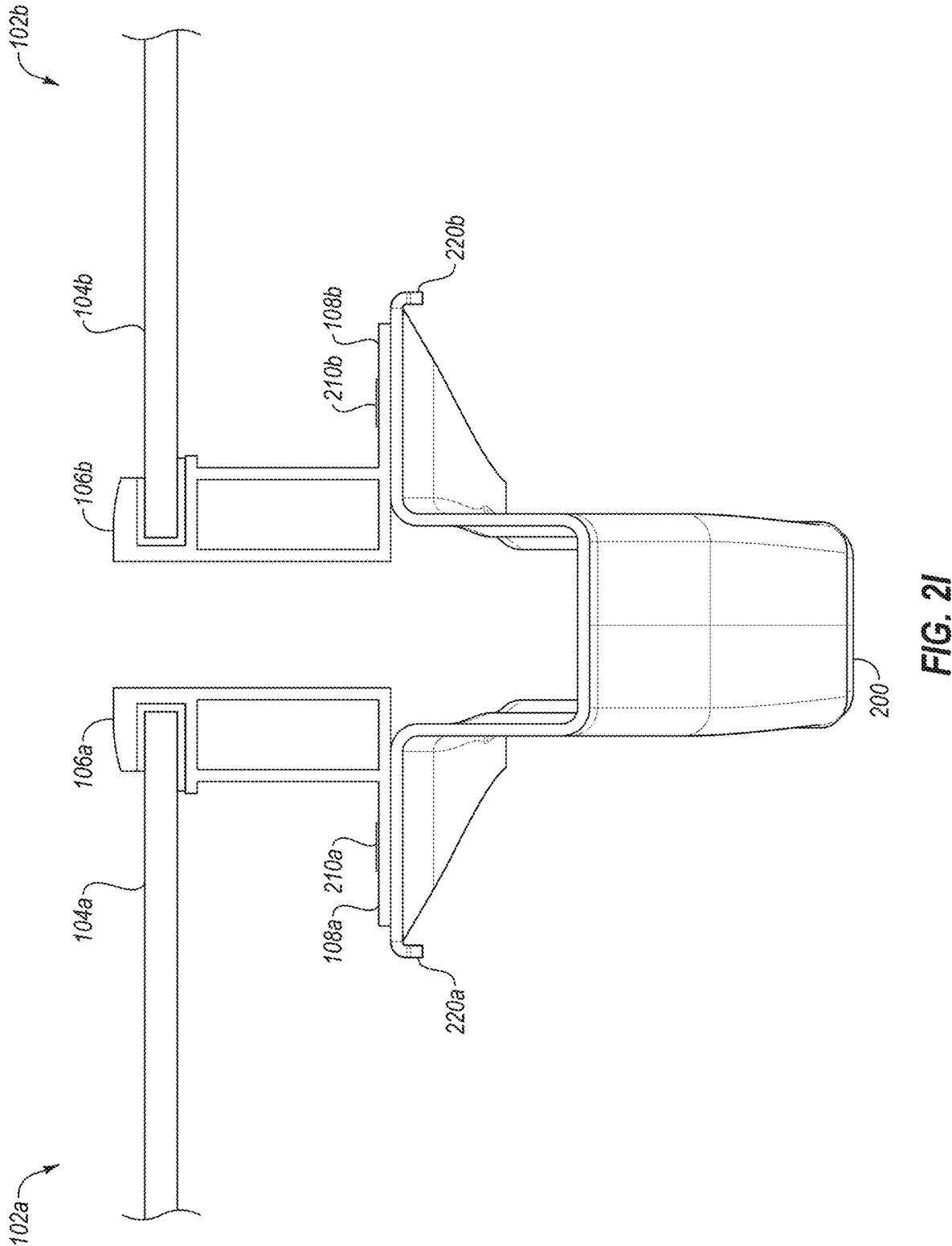

FIGS. 2A-2I illustrate various views of the PV modules 102*a* and 102*b* and mounting rail 200 shown in FIG. 1. Specifically, FIG. 2A illustrates a perspective view of a portion of the mounting rail 200. FIG. 2B illustrates a side view of the PV modules 102*a* and 102*b* prior to being positioned on the mounting rail 200. FIG. 2C illustrates a close-up side view of a portion 250 of the first mounting rail flange 202*a* and FIG. 2D illustrates a close-up perspective view of the portion 250 of the first mounting rail flange 202*a*. FIGS. 2E and 2F illustrate close-up top and perspective views of another design of the portion 250 of the first mounting rail flange 202*a*. FIGS. 2G and 2H illustrate a close up view of alternative embodiments of the clip retention tabs 220 on the first mounting rail flange 202. FIG. 2I illustrates a side view of the PV modules 102*a* and 102*b* after being positioned on the mounting rail 200.

The first and second clip retention tabs 220*a* and 220*b* each extend from a side surface of the first and/or second mounting rail flanges 202*a* and/or 202*b*. In some embodiments, the clip retention tabs 220*a* and 220*b* each may be integrally formed with the first and/or second mounting rail flanges 202*a* and/or 202*b*. In some embodiments, the clip retention tabs 220 may be constructed of one or more pieces or parts that may be separate from the mounting rail flange 202 and/or the frame rail flange 108 and installed onto one or more of the mounting rail flange 202 and/or the frame rail flange 108. In some embodiments, the first and second clip retention tabs 220*a* and 220*b* may be separated by a particular distance, the distance denoted using dashed line 222. For example, as shown in FIGS. 2D, 2G, and/or 2H, the dashed line 222 represents a particular distance which is meant to allow for the accommodation of the clip 300. For example, the clip retention tabs 220 may be configured to interface with the clip 300 and, for the clip retention tabs 220 to interface with the clip 300, the clip retention tabs 220 may be separated by a distance. In some embodiments, the distance may be determined based on the distance between the first and second arms 302*a* and 302*b*—the distance is illustrated, for example, by the arrows 322 in FIG. 3E.

In some embodiments, the first and second clip retention tabs 220*a* and 220*b* may extend along the length of the first or second mounting rail flanges 202*a* or 202*b* except for a portion of the first or second mounting rail flanges 202*a* or 202*b* between the first and second clip retention tabs 220*a* and 220*b*. In some embodiments, the opposite may be true. For example, the first and second clip retention tabs 220*a* and 220*b* may be one clip retention tab that may span the distance of what would have been the empty portion of the first and second mounting rail flanges 202*a* and 202*b*. Continuing the example, the design determination for whether the first and second clip retention tabs 220*a* and 220*b* may include two separate tabs separated by a distance or one tab spanning that same distance, is whether the clip 300 is configured to interface with the first and second clip retention tabs 220*a* and 220*b* on the outside of the clip 300 or on the inside of the clip 300. In some instances, where the first and second clip retention tabs 220*a* and 220*b* interface with one or more outer surfaces of the clip 300, the clip retention tabs 220 may be separate while, on the other hand, if the first and second clip retention tabs 220*a* and 220*b* interface with the clip 300 on one or more inner surfaces, the first and second clip retention tabs 220*a* and 220*b* may be one or more clip retention tabs 220 that may interface with one or more inner surfaces of the clip 300.

In some embodiments, the first and second clip retention tabs 220*a* and 220*b* may protrude from the first and/or second mounting rail flanges 202*a* and 202*b*. In some embodiments, the first and second clip retention tabs 220*a* and 220*b* may turn upward or downward relative to a plane on which the first and second mounting rail flanges 202*a* and 202*b* lay. In some embodiments, the turn upward or downward may assist the first and second clip retention tabs 220*a* and/or 220*b* to engage the clip or clips 300, as described in further detail with respect to FIG. 3. In some embodiments, the clip retention tabs 220 may be used with one or more module locating features 210 to decrease movement of the frame rail flange 108 and/or the mounting rail flange 202 relative to each other.

In some embodiments, the clip retention tabs 220 may be generated by bending one or more portions of the mounting rail flange 202 to accommodate the clip 300. For example, as shown in FIG. 2H, the clip retention tabs 220 are formed, machined, bent, etc. from the mounting rail flange 202 and rotated 90 degrees, or substantially 90 degrees, relative to the clip retention tabs 220 shown, for example, in FIGS. 2C and 2D. As shown, for example, in FIG. 2H, the clip retention tabs 220 may bend downward relative to the mounting rail flange 202. In some embodiments, the first and second clip retention tabs 220*a* and 220*b* may engage with the first and second retention recesses 308*a* and 308*b* to lock the clip 300 in place and limit lateral movement of the clip 300 relative to the mounting rail flange 202 and/or the frame rail flange 108. In some embodiments, the clip retention tabs 220 may be bent at any number of angles upward or downward relative to the mounting rail flange 202 as long as the clip retention tabs 220 are configured to engage with the retention recesses 308 of the clip 300.

In some embodiments, the first and second clip retention tabs 220*a* and 220*b* may be inset from the outer edge(s) of the mounting rail flanges 202. In some embodiments, the inset retention tabs 220 may protrude upward or downward relative to the mounting rail flanges 202 such that the first and second clip retention tabs 220*a* and 220*b* may engage with the first and second retention recesses 308*a* and 308*b*. For example, as shown in FIG. 2G, the first and second clip retention tabs 220*a* and 220*b* are recesses or indentations in the mounting rail flange 202 that extend downward relative to the mounting rail flange 202 such that the clip retention tabs 220 may engage with the retention recesses 308, thereby locking the clip 300 in place (e.g., limiting lateral movement of the clip 300) relative to the mounting rail flange 202 and/or the frame rail flange 108.

In some embodiments, the first and second clip retention tabs 220a and 220b may be configured to interface with one or more faces, sides, walls, etc. of the clip 300. In some embodiments, the clip 300 may not include one or more corresponding retention recesses 308 and the first and second clip retention tabs 220a and 220b may still be configured to interface with the clip 300 and provide resistance to lateral movement of the clip 300 relative to the mounting rail flange 202 and/or the frame rail flange 108. In some instances, the first arm 302a or the second arm 302b may not include a retention recess 308 and another of the first or second arms 302a or 302b may include a retention recess 308. For example, the first arm 302a may include a retention recess 308 and the second arm 302b may not include a retention recess 308 or vice versa, the first arm 302a may not include a retention recess 308 and the second arm 302b may include a retention recess 308. In some embodiments, the compression force applied by the first and second clip retention tabs 220a and 220b on the clip 300 and the corresponding force applied by the clip 300 on the first and second clip retention tabs 220a and 220b may be sufficient to hold the clip 300 in place.

In some embodiments, the mounting rail flange 202 and/or the frame rail flange 108 may not include clip retention tabs 220. In some embodiments, the clip 300 may be configured to provide a compression force on the mounting rail flange 202 and/or the frame rail flange 108 that may be sufficient to limit lateral movement of the clip 300 relative to the flange 202 and/or the frame rail flange 108.

The first and second module locating features 210a and 210b extend upward from a top surface of the first and second mounting rail flanges 202a and 202b. In some embodiments, the first and second module locating features 210a and 210b may be configured to be aligned with or inserted into or through corresponding apertures 110 positioned on the first and/or second frame rail flange(s) 108a and/or 108b. During an installation process, the first and second PV modules 102a and 102b may be positioned above the mounting rail 200, as shown in FIG. 2B. The first and second PV modules 102a and 102b may be positioned such that apertures 110 in the first and second frame rail flanges 108a and 108b align with the first and second module locating features 210a and 210b. When the first and second PV modules 102a and 102b are situated on top of the mounting rail 200, as shown in FIG. 2G, the module locating features 210 may extend into or through the apertures 110. The module locating features 210, when positioned within corresponding apertures 110, prevent the PV modules 102a and 102b from lateral and/or longitudinal movement relative to the mounting rail 200.

In some embodiments, as shown in FIGS. 2E and 2F, the module locating features 210 may include one or more protrusions 230. In some embodiments, the protrusions 230 may be created by forming a first slot 232a and a second slot 232b (the "slots 232"), each extending through the full thickness of the mounting rail 200. Additionally or alternatively, the slots 232 may extend only partially through the full thickness of the mounting rail 200.

In some embodiments, the slots 232 may be parallel or substantially parallel to each other, where substantially parallel may be measured from a first longitudinal axis extending through the middle of the first slot 232a as compared with a second longitudinal axis extending though the middle of the second slot 232b. In some embodiments, substantially parallel may indicate that the slots 232 are within 15 degrees of parallel.

In some embodiments, the slots 232 may be oriented parallel or substantially parallel to the longitudinal axis of the mounting rail 200. This orientation may allow for easier formation of the protrusions 230 and may provide improved structural integrity to the mounting rail 200.

In some instances, the widths associated with the slots 232 may be determined to provide sufficient flexibility for the formation of the protrusions 230 while maintaining the overall strength of the mounting rail 200. In some embodiments, lengths associated with the slots 232 may be identified and/or determined to provide sufficient flexibility for the formation of the protrusions 230 while maintaining the overall strength of the mounting rail 200. In some instances, the length and the width of the first and second slots 232 may be determined based on factors such as the material properties of the mounting rail 200, the desired flexibility of the protrusions 230, and the overall dimensions of the mounting rail 200, to name a few.

In some embodiments, the shape of the slots 232 may be designed to facilitate the formation and function of the protrusions 230. In some embodiments, the slots 232 may have rounded ends and generally straight sides. The rounded ends may help reduce stress concentrations at the ends of the slots 232. The straight sides of the slots 232 may provide a consistent width along the length of the slots 232, which may allow for uniform bending of the protrusions 230. The straight portions of the slots 232 may extend for a majority of the slot length, for example, between about 60% and about 90% of the total slot length.

In some embodiments, the protrusion 230 may be formed between the slots 232 using one or more dies or punches that deform a tab or material forming the protrusion 230 between the slots 232. This deformation may result in the protrusion 230 being pushed upward or downward relative to a surface of the mounting rail flange 202a.

In some embodiments, the protrusion 230 remains partially connected to the mounting rail 200, ensuring material continuity while forming the protrusion 230. Stated differently, the material making up the protrusion 230 may remain connected to the mounting rial flange 202a on both sides where the slots 232 are absent. This connection may provide structural integrity to the protrusion 230 while allowing it to extend away from the top surface of the mounting rail flange 202a. The connected portions on either side of the first and second slots 232a and 232b may act as anchoring points for the protrusion 230 and—in some instances—improving the strength and stability of the protrusion 230. In some instances, the material continuity between the protrusion 230 and the mounting rail flange 202a may also facilitate simpler manufacturing processes by allowing the protrusion 230 to be formed through deformation rather than separate attachment.

In some embodiments, the protrusions 230 may align with corresponding features on the PV module frame—e.g., the apertures 110—ensuring proper spacing of each PV module frame on the same mounting rail 200. For instance, one side of a first PV module frame may engage with one side of the mounting rail 200, using, for example, protrusions 230. Similarly, one side of a second PV module frame may align and engage with the other of the protrusions 230. As a result, the spacing of the PV module frames on the mounting rail 200 is consistently maintained based on the positioning of the protrusions 230.

Figure 3A:
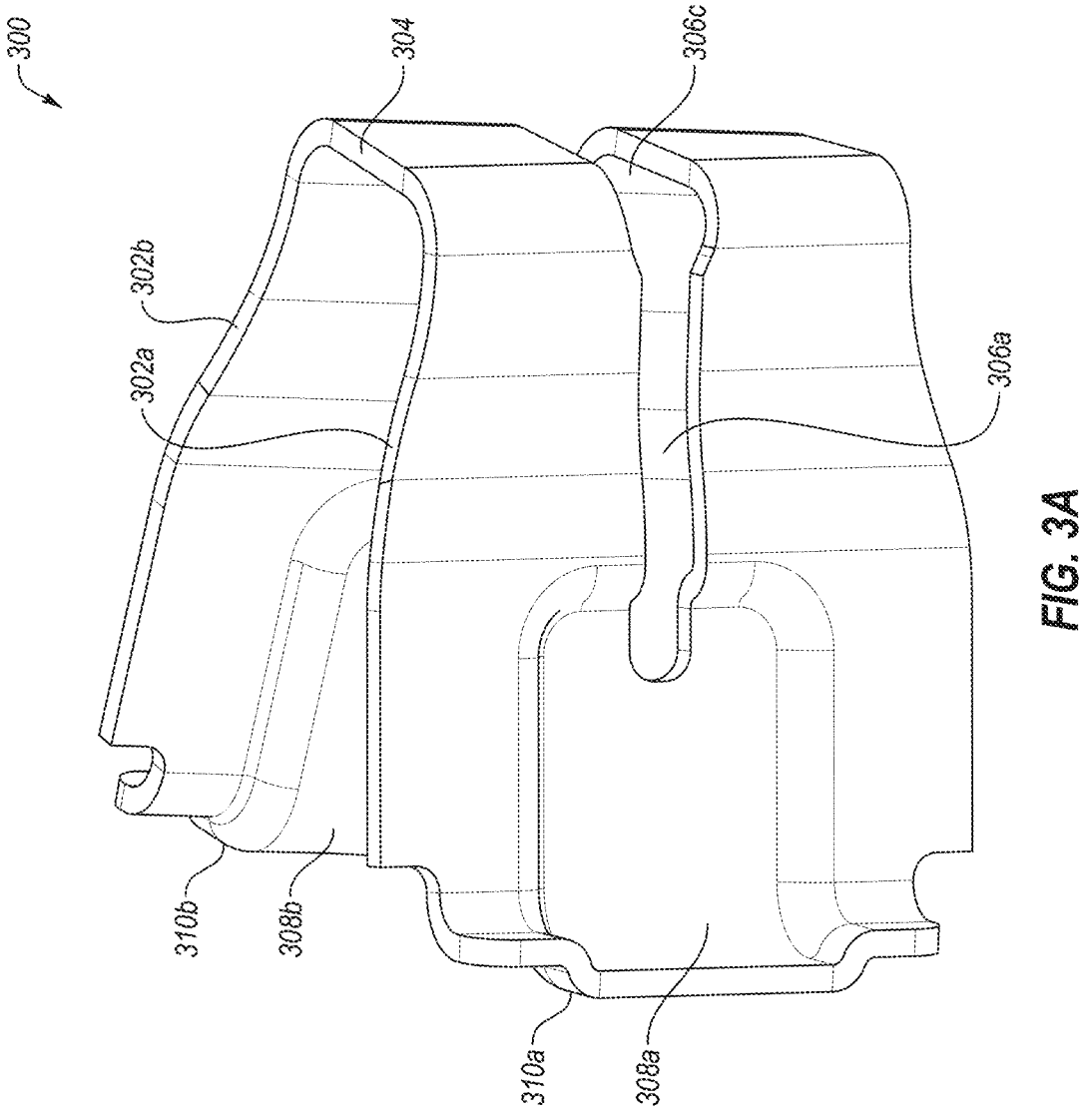
FIGS. 3A-3E illustrate a first example clip and its interaction with components shown in FIG. 1.

FIGS. 3A-3E illustrate an example clip 300 and its interaction with components shown in FIG. 1. As shown in FIG. 3A, the clip 300 includes a first arm 302a, a second arm 302b, and a connecting body 304. The first and second arms 302a and 302b each include proximal and distal ends. The connecting body 304 connects the proximal ends of the first and second arms 302a and 302b and the distal ends of the first and second arms 302a and 302b extend away from the connecting body 304.

In addition, a slot 306 is defined by a combination of the first arm 302a, the second arm 302b, and the connecting body 304. The slot 306 may extend from the connecting body 304 and the proximal ends of the first and second arms 302a and 302b through to the middle of the first and second arms 302a and 302b. In some embodiments, the slot 306 includes a larger slot portion 306c defined by the connecting body 304 and/or the proximal ends of the first and second arms 302a and 302b. The larger portion 306c may be defined as larger compared to other portions of the slot 306. For example, and as shown in FIG. 3A, the larger slot portion 306c may include a slot defined by a greater space between a top edge and a bottom edge of the slot 306 as compared to a distance between the top edge and the bottom edge of another portion of the slot 306—e.g., a portion of the slot 306 defined by the first or second arms 302a or 302b. In some embodiments, the larger slot portion 306c may be used to place or center the clip 300 on the mounting rail flange 202 and the frame rail flange 108 prior to installing the clip 300 as illustrated, for example, in FIG. 3B.

Figure 3B:
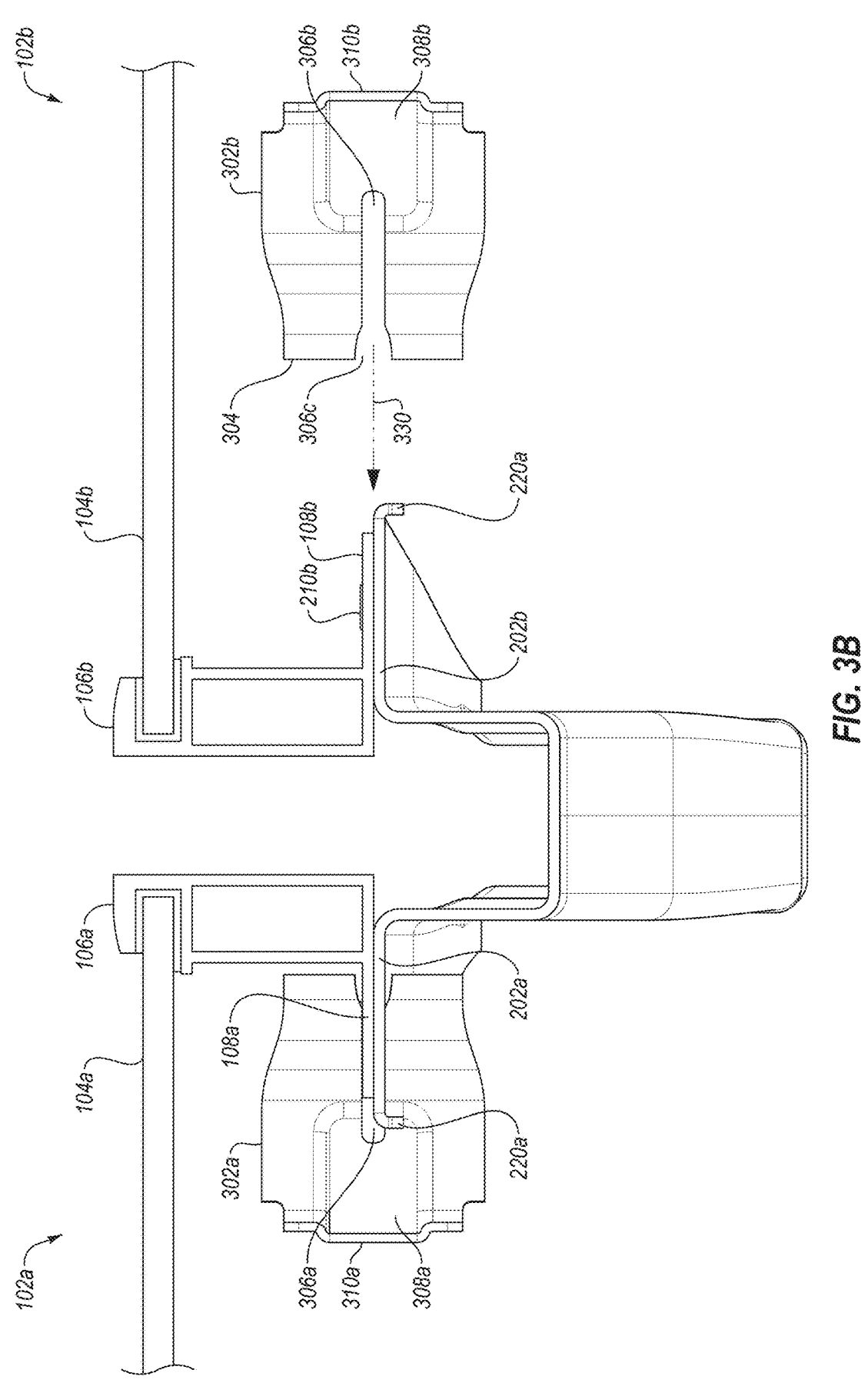

In FIG. 3B, a side view illustrating the installation of clips 300 may be shown. As illustrated in FIG. 3B, the larger portion of the slot 306c may be larger than the combined thicknesses of the mounting rail flange 202 and the frame rail flange 108. As such, the larger slot portion 306c may be used to center and place the clip 300 prior to the clip 300 applying any compression force on the mounting rail flange 202 and/or the frame rail flange 108. As such, in some embodiments, the larger slot portion 306c may allow installers to place and install the clips 300 more consistently and accurately as compared to a clip 300 with a slot 306 that does not include the larger slot portion 306c.

In some embodiments, the slot 306 may extend any distance from the proximal ends to the distal ends of the first and second arms 302a and 302b. As shown in FIG. 3A, the slot 306 extends through the proximal ends of the first and second arms 302a and 302b and partially through the first and second retention recesses 308a and 308b included in the first and second arms 302a and 302b, respectively. In some embodiments, a length of the slot 306 along the first and second arms 302a and 302b may be as long as necessary for the clip retention tabs 220 to engage the first and second retention recesses 308a and 308b.

The first and second retention recesses 308a and 308b are positioned on the first and second arms 302a and 302b from the middle through the distal ends of the first and second arms 302a and 302b. In some embodiments, the first and second retention recesses 308a and 308b may be located on different portions of the first and second arms 302a and 302b. For example, the first and second retention recesses 308a and 308b may be localized in the middle of the first and second arms 302a and 302b. In some embodiments, the first and second retention recesses 308a and 308b may be located more toward the proximal and/or distal ends of the first and second arms 302a and 302b. As shown in FIGS. 3A-3E, the first and second retention recesses are substantially rectangular. However, the first and second retention recesses 308a and 308b may be any particular shape.

Additionally or alternatively, the first and second retention recesses 308a and 308b may extend along the height of the clip 300. The first and second retention recesses 308a and 308b may be configured to interface with one or more clip retention tabs 220 such as the first and second clip retention tabs 220a and 220b described, for example, with respect to FIGS. 1 and 2A-2I. As such, the shape, size, position, etc. associated with the first and second retention recesses 308a and 308b may be determined by the size, shape, position, etc. of the first and second clip retention tabs 220a and 220b and vice versa.

Figure 3C:
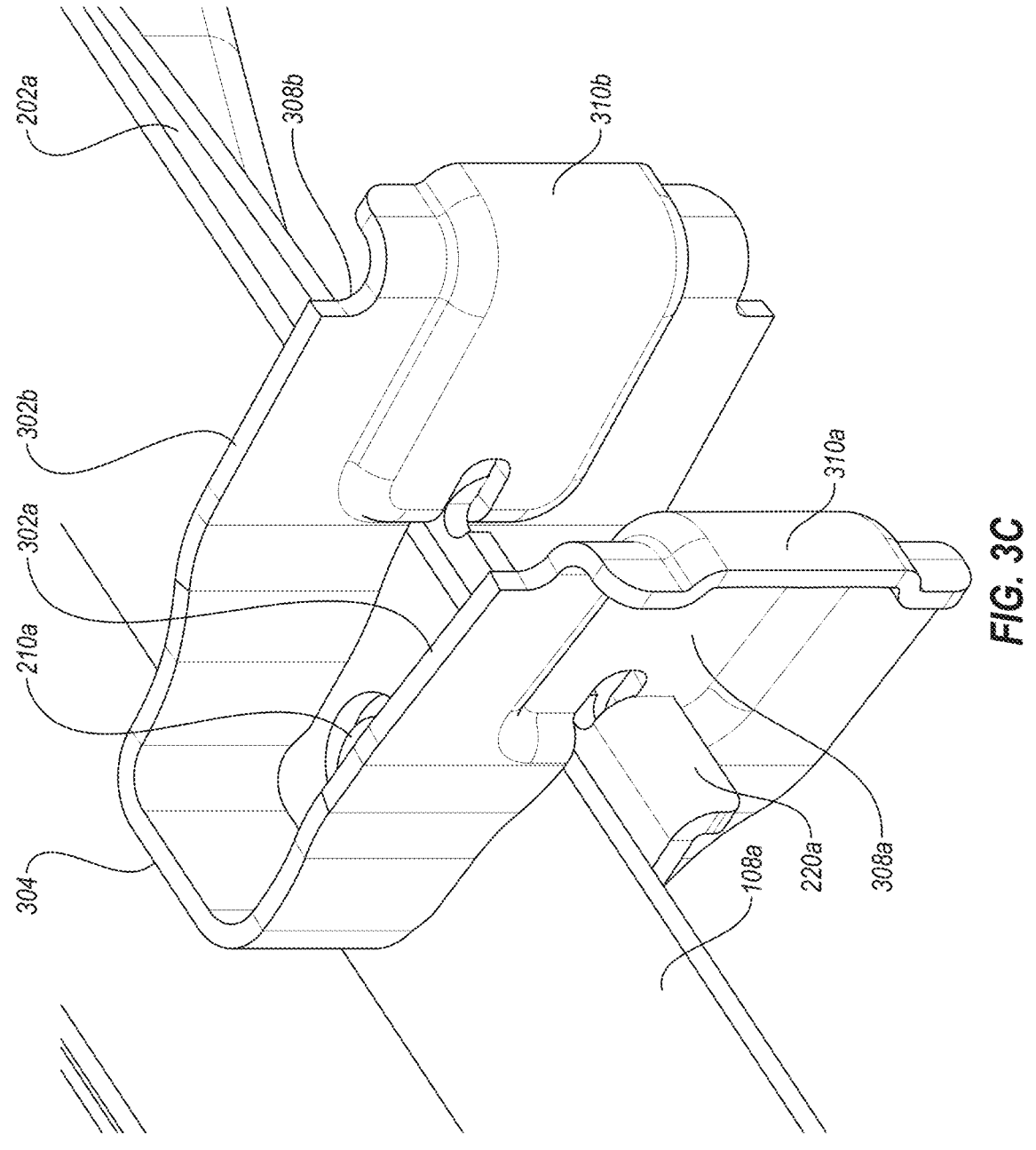

In some embodiments, the first and second retention recesses 308a and 308b may be configured to interface with the clip retention tabs 220 (e.g., the first and second clip retention tabs 220a and 220b) such that the clip 300 may not slip laterally relative to the mounting rail flange 202. In some embodiments, the first and second clip retention tabs 220a and 220b may protrude outward and turn downward relative to the mounting rail flange 202. The turn downward may help to engage the clips 300 and/or the corresponding first and second retention recesses 308a and 308b. In some embodiments, the turn downward may prevent the clips 300 from dislodging or disengaging and moving outward relative to the frame rail flange 108 and/or the mounting rail flange 202. For example, as shown in FIG. 3C, the clip 300 may engage the first mounting rail flange 202a and the first frame rail flange 108a. The first clip retention tab 220a is shown engaging the first retention recess 308a. The first arm 302a of the clip 300 pushes outward applying an expansion force against the first retention tab 220a. The first retention tab 220a applies a corresponding compression force. In some embodiments, the first retention tab 220a may include a downward bend to engage the first retention recess 308a outside of the slot 306. Further, the first clip retention tab 220a extends over a lip corresponding to the first retention recess 308a which may reduce slipping or twisting of the clip 300 relative to the first mounting rail flange 202a and/or the frame rail flange 108a.

FIGS. 3B and 3C illustrate side and bottom views, respectively, of the PV modules 102a and 102b positioned on the mounting rail 200 with one clip 300 shown just prior to installation and another clip 300 shown after installation. To install the clip 300, it is moved in the direction shown by arrow 330 such that the second frame rail flange 108b and the second mounting rail flange 202b are positioned within the slot 306. The first and second retention tabs 220a and 220b slide alongside the slot 306 and into the first and second retention recesses 308a and 308b. Sliding the clip 300 relative to the first and second retention tabs 220a and 220b may cause the clip 300 to flex such that the first and second arms 302a and 302b move inward toward each other. Moving the first and second arms 302a and 302b relative to each other causes an expansion force applied from the first and second arms 302a and 302b to the clip retention tabs 220a and 220b which assists in keeping the clip 300 in place when properly installed with the clip retention tabs 220a and 220b.

In some embodiments, the first and second arms 302a and 302b may be compressed, flexed, or otherwise moved inward relative to each other using one or more tools or other methods. Compressing the first and second arms 302a and 302b toward each other may allow for unobstructed or less obstructed sliding of the clip 300 relative to the first and second retention tabs 220a and 220b. In some embodiments, the compression force applied to the first and second arms 302a and 302b may be released once the first and second retention tabs 220a and 220b are aligned with the first and second retention recesses. In response, the first and second retention recesses 308a and 308b may interface with the first and second retention tabs 220a and 220b such that the first and second arms 302a and 302b apply an expansion force to the clip retention tabs 220.

During installation of the clip 300, first and second arms 302a and 302b slide past the lateral clip retention tabs 220. Once installed, the lateral clip retention tabs 220 prevent the clip 300 from moving laterally relative to the mounting rail 200, as outside or exterior surfaces of the first and second arms 302a and 302b contact the lateral clip retention tabs 220.

Figures 3D, 3E:
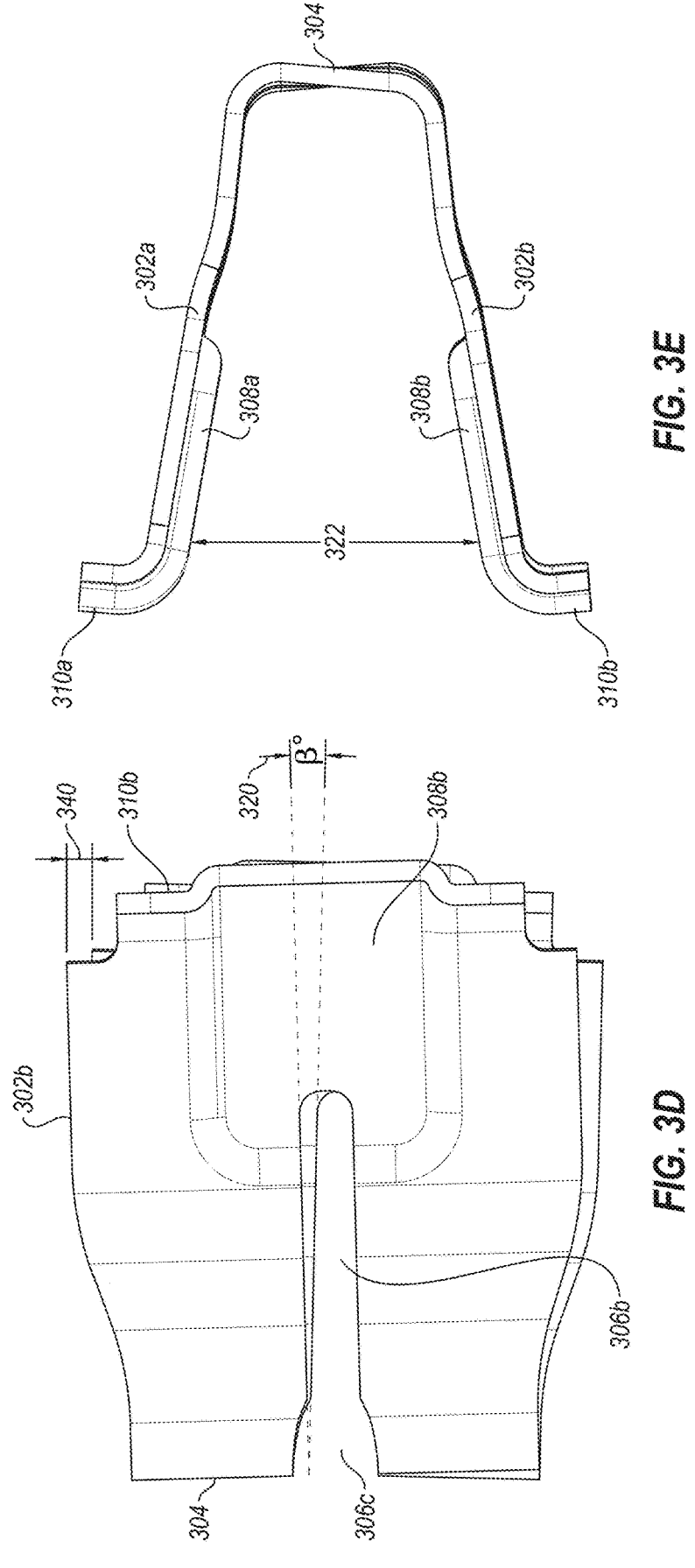

As shown in FIG. 3E, the flexion and potential for applying expansion forces from the first and second arms 302a and 302b may be illustrated by the distance between the first and second arms 302a and 302b shown using arrows 322. In some embodiments, the distance between the first and second arms 302a and 302b may be measured using any point along the first and second arms 302a and 302b. In some embodiments, as the distance between the first and second arms 302a and 302b decreases, the corresponding expansion force or tendency of the first and second arms 302a and 302b to push outward increases. In some embodiments, installing the clip 300 includes using the clip retention tabs 220a and 220b to force the first and second arms 302a and 302b closer relative to each other. When the clip retention tabs 220a and 220b slide into the corresponding clip retention recesses 308A and 308b, the first and second arms 302a and 302b expand outward and engage with the clip retention tabs 220a and 220b, decreasing or eliminating lateral slipping of the clip 300 relative to the first mounting rail flange 202a and/or the frame rail flange 108a.

As shown in FIG. 3C, the clip 300 includes a first clip flange 310a and a second clip flange 310b positioned at the distal ends of the first and second arms 302a and 302b, respectively. In some embodiments, and as shown in FIG. 3C, the first and second clip flanges 310a and 310b may bend outward relative to a center axis of the clip 300. The first and second clip flanges 310a and 310b may bend outward such that the first and second clip flanges 310a and 310b may be generally parallel to the first mounting rail flange 202a and/or the frame rail flange 108a. In some embodiments, the first and second clip flanges 310a and 310b may be used for one or more installation tools. For example, the first and second clip flanges 310a and 310b may provide surfaces that may be struck with a mallet or a hammer to facilitate the installation of the clip 300. Additionally or alternatively, the first and second clip flanges 310a and 310b may provide surfaces that may be gripped by one or more tools to compress the first and second arms 302a and 302b together during installation such that, upon release, the first and second arms 302a and 302b may expand and apply an expansion force on, for example, the first and second clip retention tabs 220a and 220b thereby holding the clip 300 in place or reducing lateral movement of the clip 300, in an engaged state.

In some configurations, and as shown in FIG. 3D, the clip 300 may include a twist, bend, or center lines corresponding to slot portions defined in the first and second arms 302a and 302b that may be offset (hereinafter "offset center lines") such that one arm may extend from the connecting portion 304 at a different angle as compared to the other arm. For example, the first arm 302a may extend from the connecting portion 304 at an angle β 320 relative to the second arm 302b extending from the connecting portion 304. In some embodiments, the twist, bend, or offset center lines (or angle β described above) may enable application of a compression force on the mounting rail flange 202 and the frame rail flange 108 when the slots defined by the first arm and the second arm 302a and 302b are brought into alignment by the mounting rail flange 202 and the frame rail flange 108. In some embodiments, the compression force applied to the mounting rail flange 202 and the frame rail flange 108 may be applied by an elastic force corresponding to the connecting body 304. In some embodiments, the offset center lines may enable the clip 300 to apply an adequate compression force to the mounting rail flange 202a and the frame rail flange 108a, where an adequate compression force includes an ability to establish and maintain an electrical grounding path between the PV module 102 and the mounting rail 200.

In some embodiments, the angle β 320 may be determined based on manufacturing tolerances corresponding to thicknesses of the mounting rail flange 202 and the frame rail flange 108. For example, the slot 306 may be sized to snugly receive maximum manufacturing tolerances of the mounting rail flange 202 and the frame rail flange 108 collectively. However, in some instances, the mounting rail flange 202 and the frame rail flange 108 may be manufactured to manufacturing tolerances less than the maximum. In some instances, the mounting rail flange 202 and the frame rail flange 108 may be constructed according to minimum manufacturing tolerances. In those instances, the first arm 302a of the clip may extend from the connecting portion 304 at an angle β 320 relative to the second arm 302b which may decrease a distance between an upper edge of the slot 306 defined by the first arm 302a and the upper edge of the slot 306 defined by the second arm 302b, the distance illustrated by arrows 340 in FIG. 3D. In instances where the mounting rail flange 202 and the frame rail flange 108 are manufactured to minimum manufacturing tolerances, the clip 300 may still apply an adequate compression force to the mounting rail flange 202a and the frame rail flange 108a because of a difference in the angle β 320 that one of the arms 302 extends relative to the other arm 302. Further, in some embodiments, the offset center lines, the twist, or difference in the angle β 320 that one of the arms 302 extends relative to the other arm 302 may increase a range of thicknesses corresponding to the frame rail flange 108a and the mounting rail flange 202a to which the clips 300 may be compatible. In some embodiments, the offset center lines may assist in eliminating or reducing gaps between frame rail flanges 108 and mounting rail flanges 202 of varying sizes and thicknesses, when the clip 300 is in an installed state.

In some embodiments, the offset center lines corresponding to the clip 300 may enable the clip to engage with the mounting rail flange 202 and the frame rail flange 108 without a need for one or more retention recesses 308 and/or clip retention tabs 220. For example, the offset center lines corresponding to the clip 300 may allow the clip 300 to apply an adequate compression force to the mounting rail flange 202a and the frame rail flange 108a.

In an alternative embodiment, the first and second arms 302a and 302b may extend from the connecting body 304 along the same plane. The first and second arms 302a and 302b may define respective portions of the slot 306 that may be angled differently or opposite from one another. For example, the first arm 302a may define a first slot portion that angles upward from the connecting portion 304 and the second arm 302b may define a second slot portion that angles downward from the connecting portion 304. In some embodiments, the slot portions being angled differently with respect to each other may enable a compression force to be applied to the mounting rail flange 202 and the frame rail flange 108 in an installed state. In some embodiments, the compression force may be applied by an elastic force from the connecting body 304 when the slot portions are brought into alignment. In some embodiments, the slot portions may extend at the same angle β with respect to each other as described, for example, above.

Figure 4:
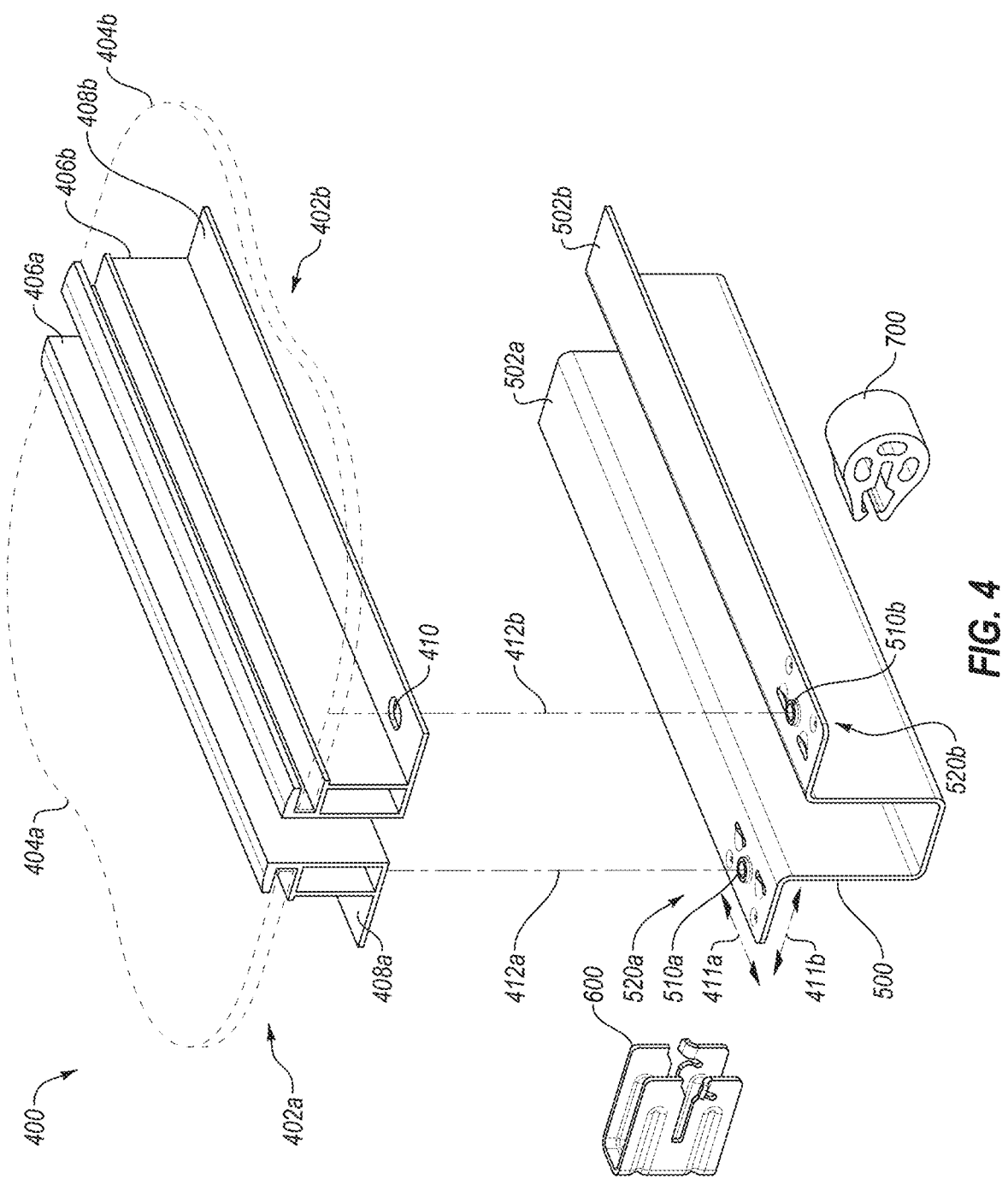
FIG. 4 illustrates an exemplary system for securing PV modules to a mounting rail.

FIG. 4 illustrates another exemplary system 400 securing first and second PV modules 402a and 402b to a mounting rail 500 using clips 600 and 700. The first PV module 402a includes a first solar panel 404a and a first frame 406a that is secured to an edge of the first solar panel 404a. The first frame 406a includes a first frame rail flange 408a that is generally parallel to the first solar panel 404a. The second PV module 402b includes a second solar panel 404b and a second frame 406b that is secured to an edge of the second solar panel 404b. The second frame 406b includes a second frame rail flange 408b that is generally parallel to the second solar panel 404b. The second frame rail flange 408 also includes an aperture 410. While the aperture 410 is shown having an oval shape, this aperture may have any size and shape and may be positioned anywhere on the second frame rail flange 408b. In some embodiments, the aperture may have a circular or polygonal shape. While not shown in FIG. 4, the first frame rail flange 408a may also include an aperture that is consistent in size, shape, and position with the aperture 410.

The mounting rail 500 includes first and second mounting rail flanges 502a and 502b. An upper surface of the first mounting rail flange 502a is configured to interface with a bottom surface of the first frame rail flange 408a to support the first PV module 402a. The first and second mounting rail flanges 502a and 502b include module locating features 510a and 510b. These module locating features 510a and 510b comprise protrusions that extend from the upper surface of the first and second mounting rail flanges 502a and 502b. The shapes of these protrusions may be configured to fit within the apertures 410 of the first and second frame rail flanges 408a and 408b such that during an installation procedure, the module locating features 510a and 510b may fit within the apertures 410. This may be accomplished by lowering the first and second PV modules 402a and 402b down onto the mounting rail 500 or raising the mounting rail 500 up as shown by the dashed lines 412a and 412b. The module locating features 510a and 510b may have any height. In some embodiments, the height of the module locating features 510a and 510b may be approximately equal to the width of the first and second frame rail flanges 408a and 408b. When the module locating features 510a and 510b are properly positioned within corresponding apertures 410, any lateral (shown by arrow 411a) or longitudinal (shown by arrow 411b) slippage between the first and second PV modules 402a and 402b and the mounting frame 500 may be reduced or eliminated.

The first and second mounting rail flanges 502a and 502b also include clip retaining features 520a and 520b. The clip retaining features 520a and 520b include protrusions that extend from a bottom surface of the first and second mounting rail flanges 502a and 502b. As provided in more detail hereafter, the clip retaining features 520a and 520b prevent and/or limit the clips 600 and 700 from slipping relative to the mounting rail 500 after installation. In other words, the clip retaining features 520a and 520b ensure that clips 600 and 700 remain securely in place to connect the first and second PV modules 402a and 402b to the mounting rail 500.

Thus, in FIG. 4, the clips 600 and 700 secure the first and second PV modules 402a and 402b to the mounting rail 500, the module locating features 510a and 510b together with apertures 410 ensure that the first and second PV modules 402a and 402b are aligned properly on the mounting rail 500 and do not slip relative to each other, and the clip retaining features 520a and 520b ensure that the clips 600 and 700 do not slip or disengage from their positions securing the first and second PV modules 402a and 402b to the mounting rail 500.

Modifications, additions, or omissions may be made to the system 400 without departing from the scope of the disclosure. For example, another system for securing PV modules to a mounting rail, a PV module may lack a flange but include another structure that may be used to secure the PV module to a mounting rail. In addition, the designations of different elements in the manner described is meant to help explain concepts described herein and is not limiting. Further, the system 400 may include any number of other elements or may be implemented within other systems or contexts than those described.

Figure 5A:
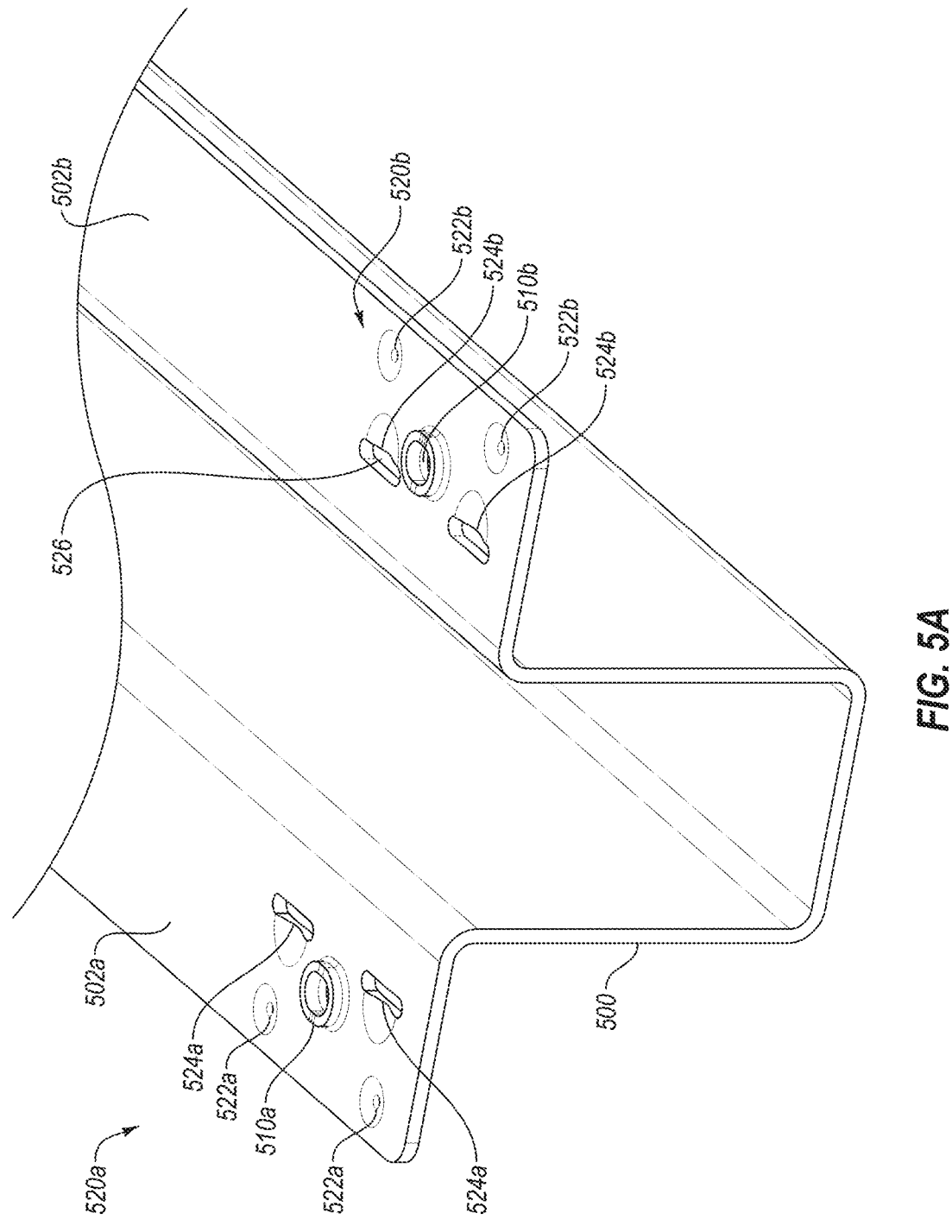
FIGS. 5A-5D illustrate various views of the PV modules and mounting rail shown in FIG. 4.
Figure 5B:
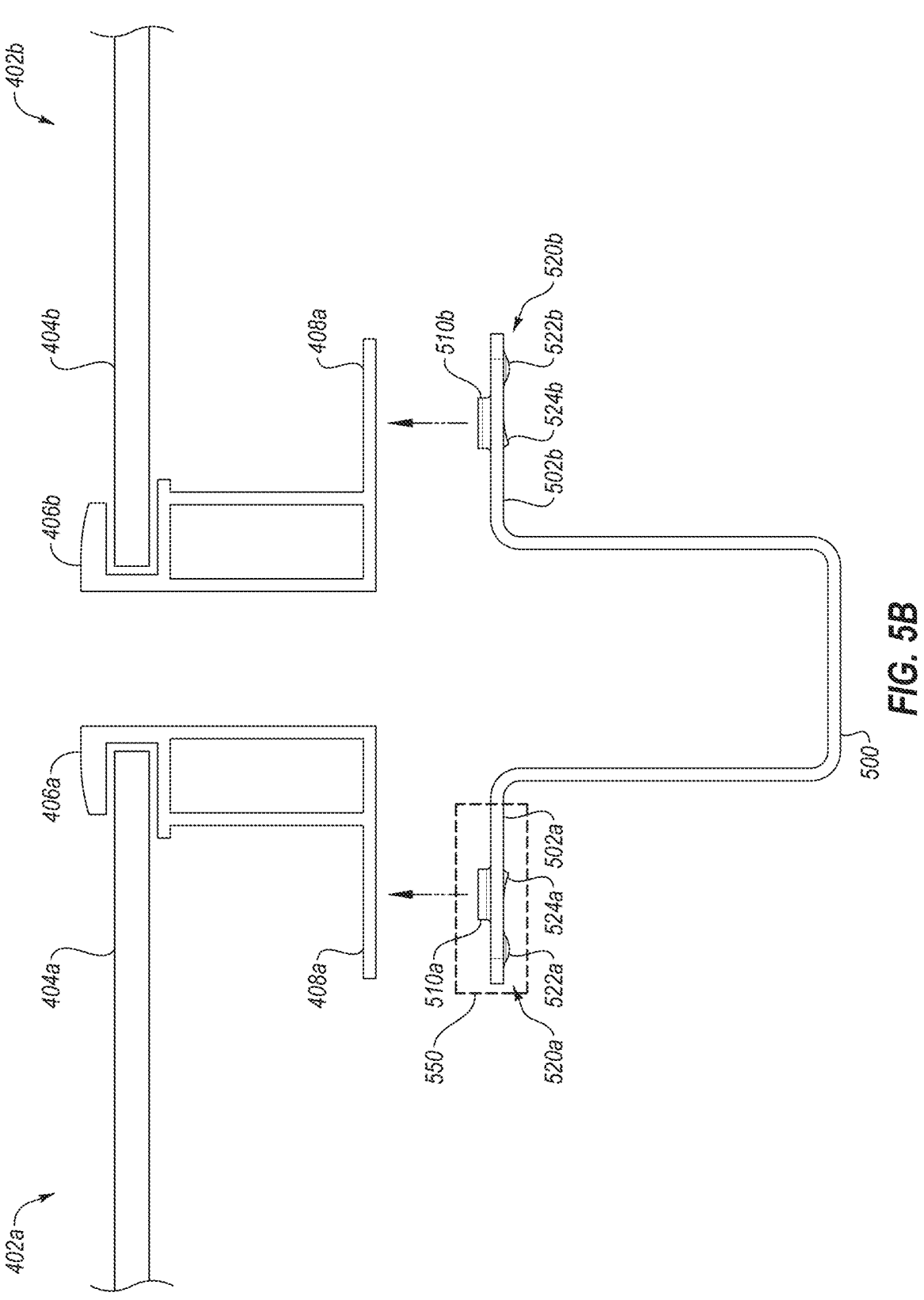
Figure 5C:
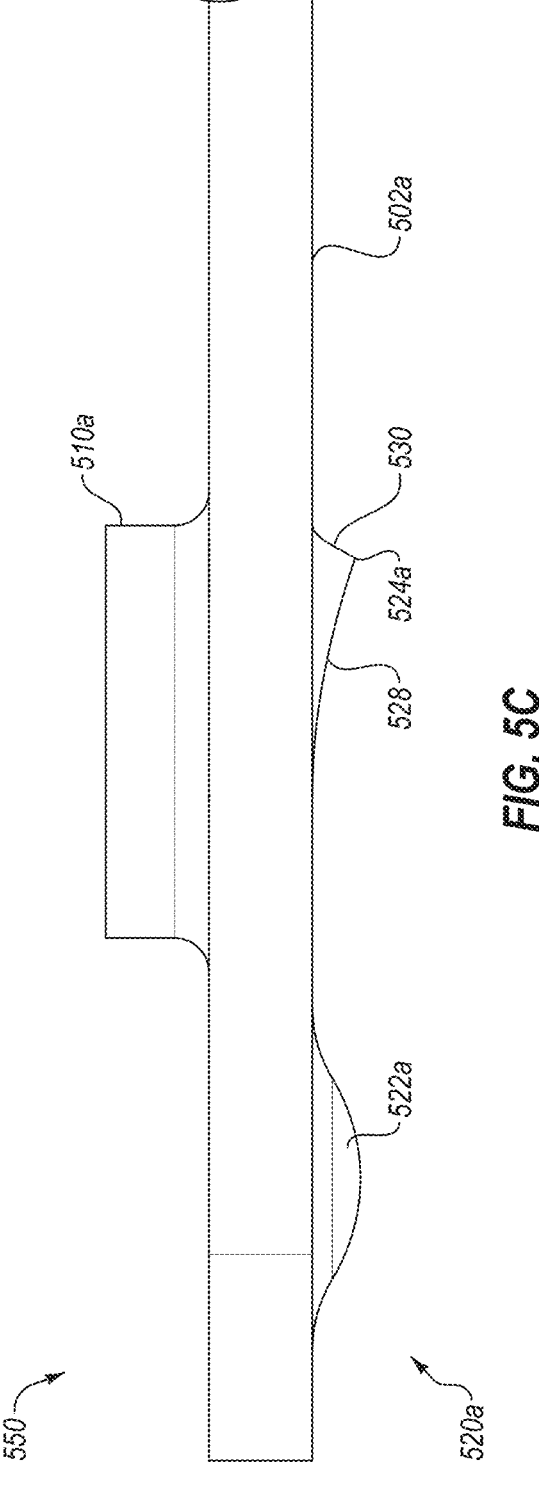
Figure 5D:
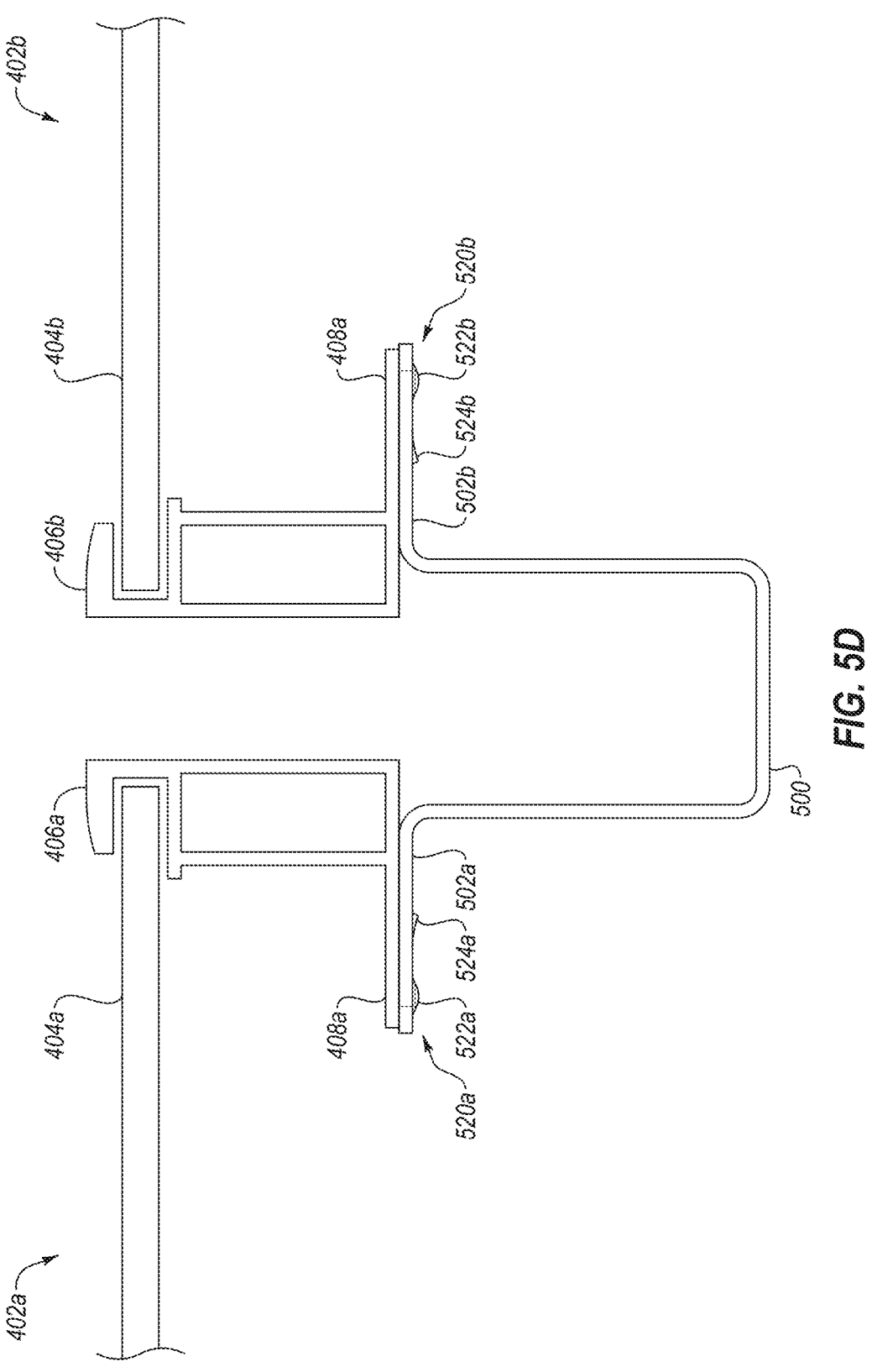

FIGS. 5A-5D illustrate various views of the PV modules 402a and 402b and mounting rail 500. Specifically, FIG. 5A illustrates a perspective view of the mounting rail 500. FIG. 5B illustrates a side view of the PV modules 402a and 402b prior to being positioned on the mounting rail 500. FIG. 5C illustrates a close up view of a portion 550 of the first mounting rail flange 502a and FIG. 5D illustrates a side view of the PV modules 402a and 402b after being positioned on the mounting rail 500.

The clip retaining features 520a and 520b each include lateral clip retention protrusions 522a and 522b, respectively. The clip retaining features 520a and 520b each also include longitudinal clip retention protrusions 524a and 524b, respectively. The lateral clip retention protrusions 522a and 522b comprise indentations on the top surface of the first and second mounting rail flanges 502a and 502b, which create protrusions that extend below a bottom surface of the first and second mounting rail flanges 502a and 502b. While the lateral clip retention protrusions 522a and 522b are circular, they can have any shape. A few of the alternative shapes are provided in the embodiments described hereafter. In addition, there need not be any indentation on the top surface of the first and second mounting rail flanges. In these embodiments, the lateral clip retention protrusions 522a and 522b may simply include protrusions from a bottom surface of the first and second mounting rail flanges 502a and 502b. The lateral clip retention protrusions 522a and 522b are configured to prevent lateral movement of a clip that secures a PV module to a mounting rail.

The longitudinal clip retention protrusions 524a and 524b also comprise indentations on the top surface of the first and second mounting rail flanges 502a and 502b, which create protrusions that extend below a bottom surface of the first and second mounting rail flanges 502a and 502b. The longitudinal clip retention protrusions 524a and 524b have a ramp and ridge shape. For example, as can be seen more clearly in FIG. 5C, the longitudinal clip retention protrusion 524a includes a ramp portion 528 that increases in height as the protrusion moves away from an edge of the first mounting rail flange 502a. On an opposite side of the ramp portion is a ridge portion 530 that is much steeper than the ramp portion 528. The lateral clip retention protrusions 522a and 522b may include recesses or apertures (shown in FIG. 5A) behind the ridge portion 530. While the longitudinal clip retention protrusions 524a and 524b include indentations and apertures on top surfaces of the first and second mounting rail flanges 502a and 502b, these indentations and apertures are not required. In these embodiments, the longitudinal clip retention protrusions 524a and 524b may simply include protrusions from a bottom surface of the first and second mounting rail flanges 502a and 502b. The lateral clip retention protrusions 522a and 522b are configured to prevent longitudinal movement of a clip that secures a PV module to a mounting rail.

The module locating features 510a and 510b extend upward from a top surface of the first and second mounting rail flanges 502a and 502b. During an installation process, the first and second PV modules 402a and 402b may be positioned above the mounting rail 500, as shown in FIG. 5B. The first and second PV modules 402a and 402b may be positioned such that apertures 410 in the first and second frame rail flanges 408a and 408b align with the module locating features 510a and 510b. When the first and second PV modules 402a and 402b are situated on top of the mounting rail 500, as shown in FIG. 5D, the module locating features 510a and 510b may extend through the apertures 410. The module locating features 510a and 510b, when positioned within corresponding apertures 410, prevent the PV modules 402a and 402b from lateral and/or longitudinal movement relative to the mounting rail 500. In some embodiments, the module locating features 510a and 510b may include bent portions of the mounting rail 500 described, for example, as the protrusions 230 with respect to FIGS. 2E and 2F.

Figure 6A:
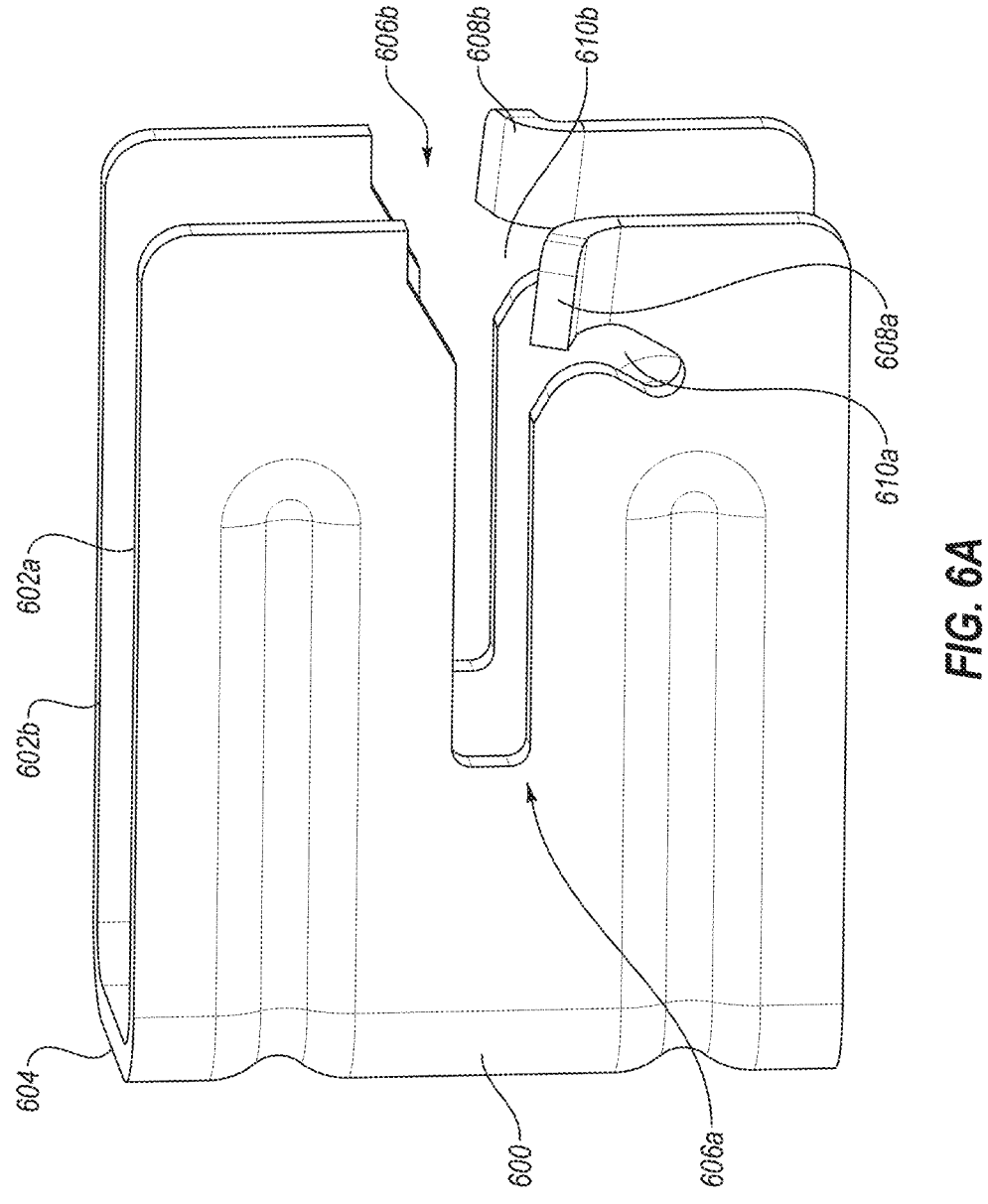
FIGS. 6A-6C illustrate a second example clip and its interaction with components shown in FIG. 4.
Figure 6B:
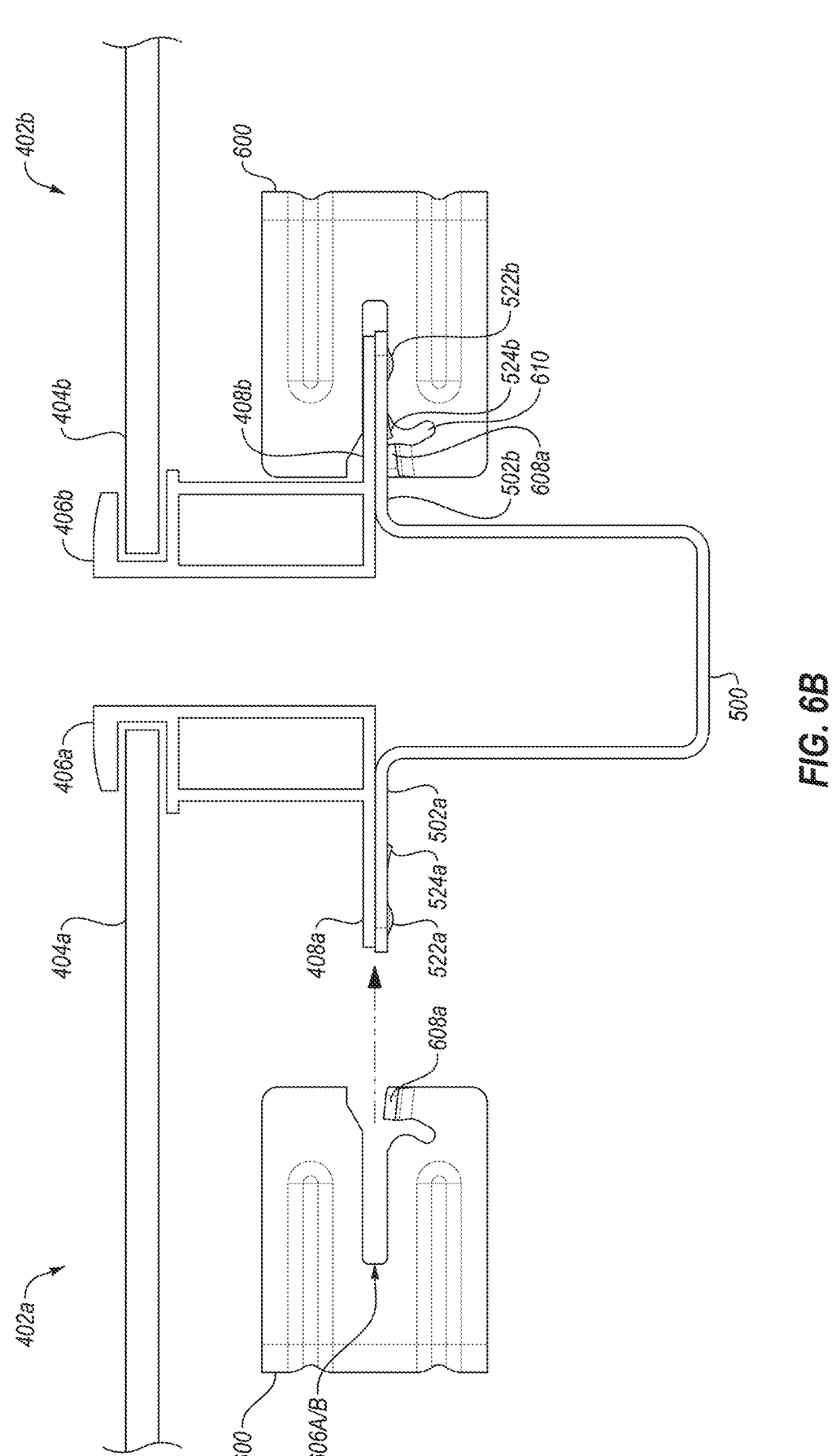
Figure 6C:
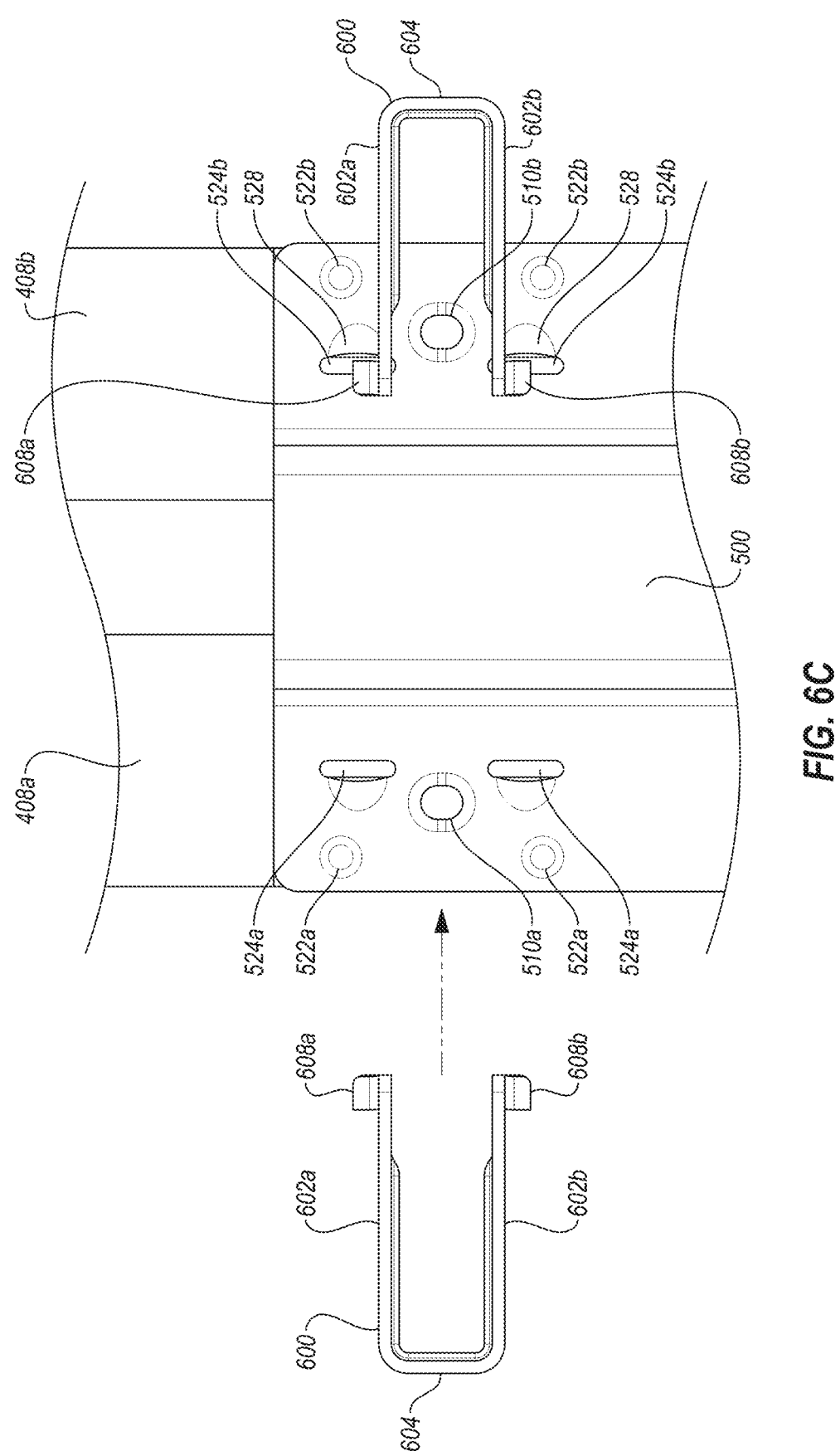

FIGS. 6A-6C illustrate two clips 600 and their interactions with components shown in FIG. 4. As shown in FIG. 6A, the clips 600 include a first arm 602a, a second arm 602b, and a connecting body 604. A first slot 606a is defined by the first arm 602a. A second slot 606b is defined by the second arm 602b. Retention tabs 608a and 608b are positioned at the ends of the first and second arms 602a and 602b just within the first and second slots 606a and 606b. Recesses 610a and 610b are positioned directly behind the retention tabs 608a and 608b. Alternative embodiments of a clip may lack these recesses.

FIGS. 6B and 6C illustrate side and bottom views, respectively, of the PV modules 402a and 402b positioned on the mounting rail 500 with one clip 600 shown just prior to installation and another clip 600 shown after installation. To install the clip 600, it is moved in the direction shown by the arrows so that the first frame rail flange 408a and the first mounting rail flange 502a are positioned within the first and second slots 606a and 606b. The first and second retention tabs 608a and 608b slide over the ramp portions of 528 of the longitudinal clip retention protrusions 524a and 524b. Movement of the first and second retention tabs 608a and 608b over the longitudinal clip retention protrusions 524a and 524b may require the clip 600 to flex such that the width of the slots 606a and 606b slightly expand during installation.

Once the first and second retention tabs 608a and 608b have moved past the ramp portions 528 of the longitudinal clip retention protrusions 524a and 524b, the clip 600 and the slots 606a and 606b may return to their original shape and size. For example, as shown with the installed clip 600, retention tabs 608a and 608b are resting against ridge portions 530 of the longitudinal clip retention protrusions 524b. The longitudinal clip retention protrusions 524b extend into recesses 610a and 610b, which are positioned directly behind the retention tabs 608a and 608b. The longitudinal clip retention protrusions 524b prevent the clip 600 from backing out and disengaging from its installed position.

During installation of the clip 600, first and second arms 602a and 602b slide past the lateral clip retention protrusions 522b. Once installed, the lateral clip retention protrusions 522b prevent the clip 600 from moving laterally relative to the mounting rail 500, as outside or exterior surfaces of the first and second arms 602a and 602b would contact the lateral clip retention protrusions 522b.

Figure 7A:
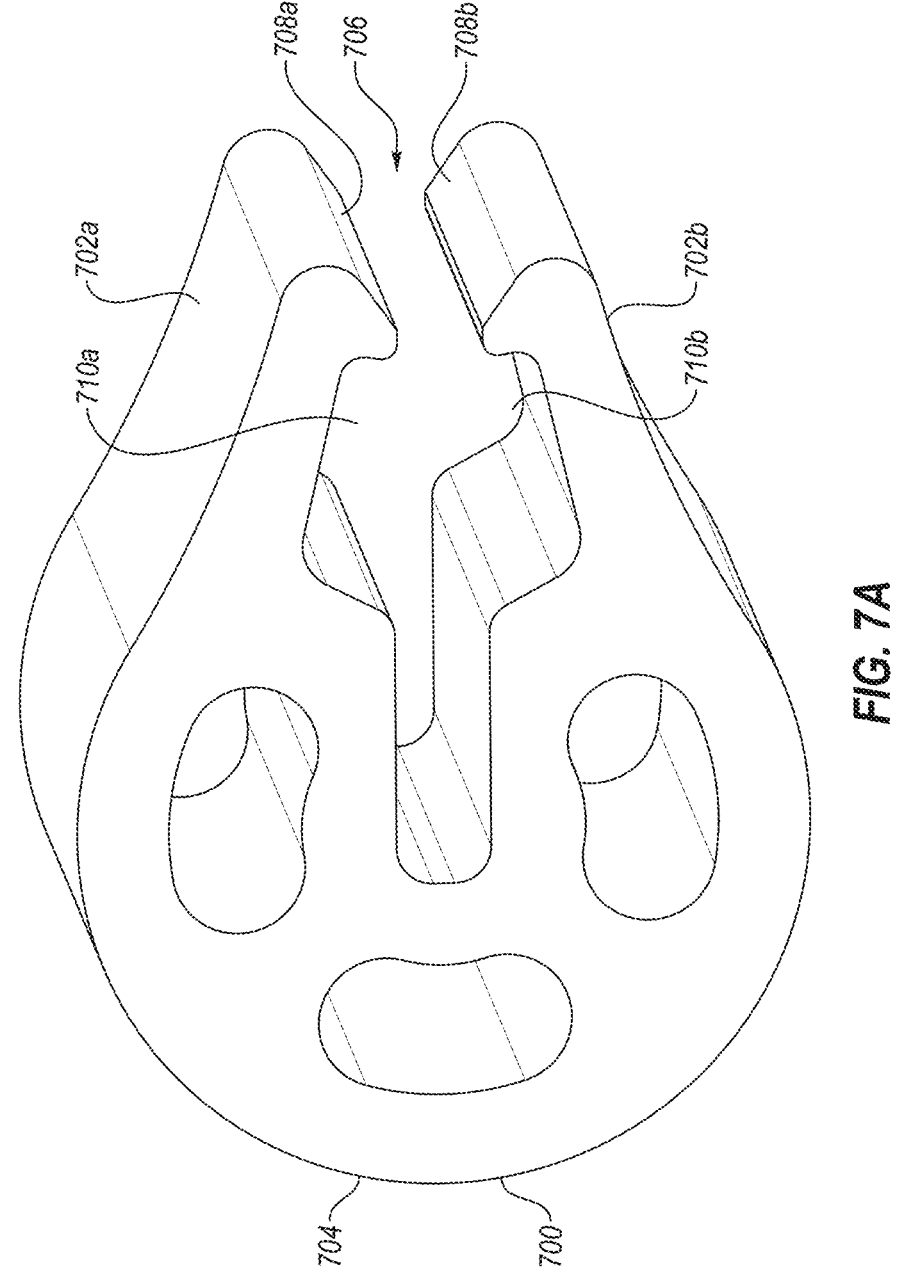
FIGS. 7A-7C illustrate a third example clip and its interaction with components shown in FIG. 4.
Figure 7B:
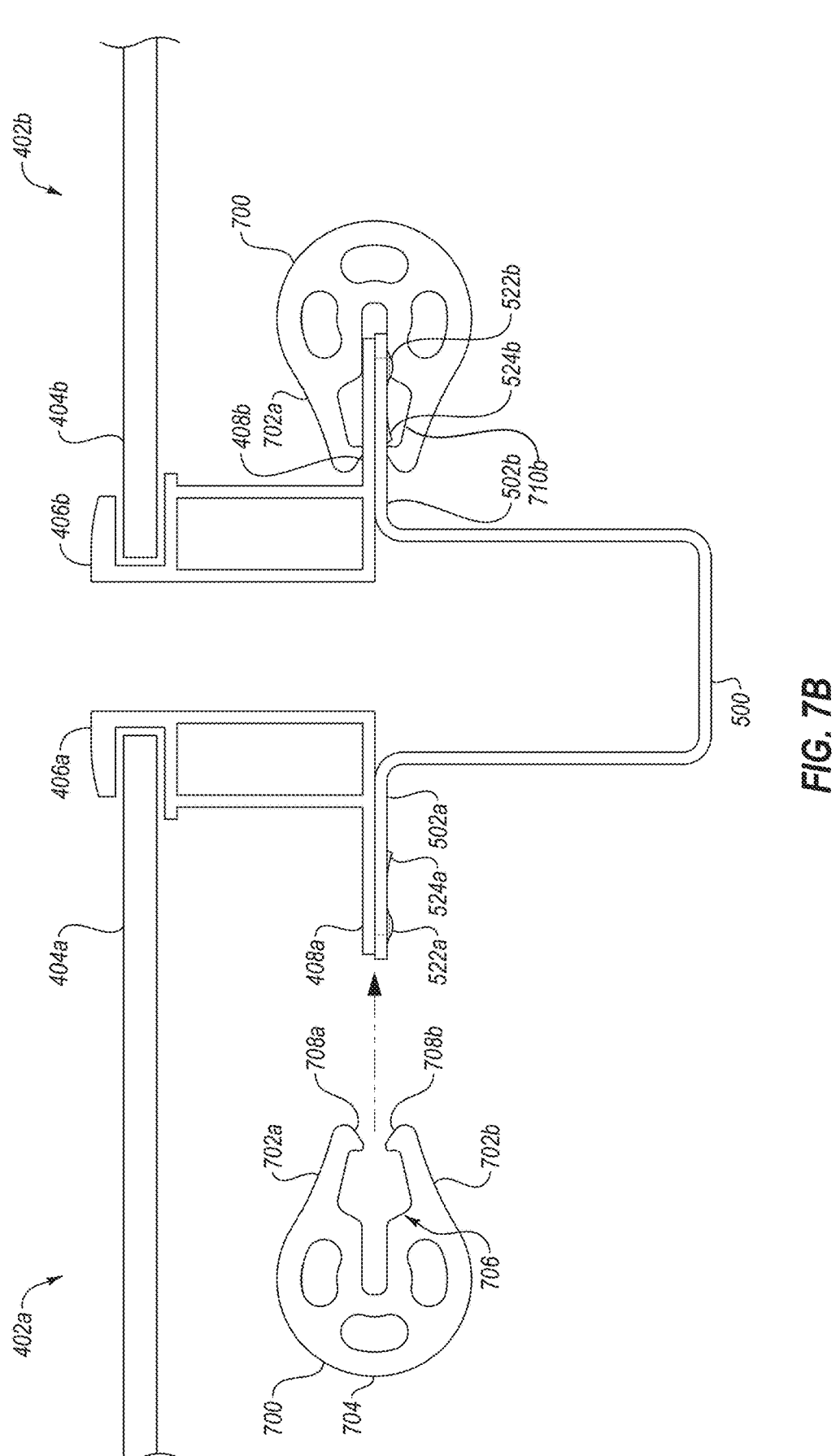
Figure 7C:
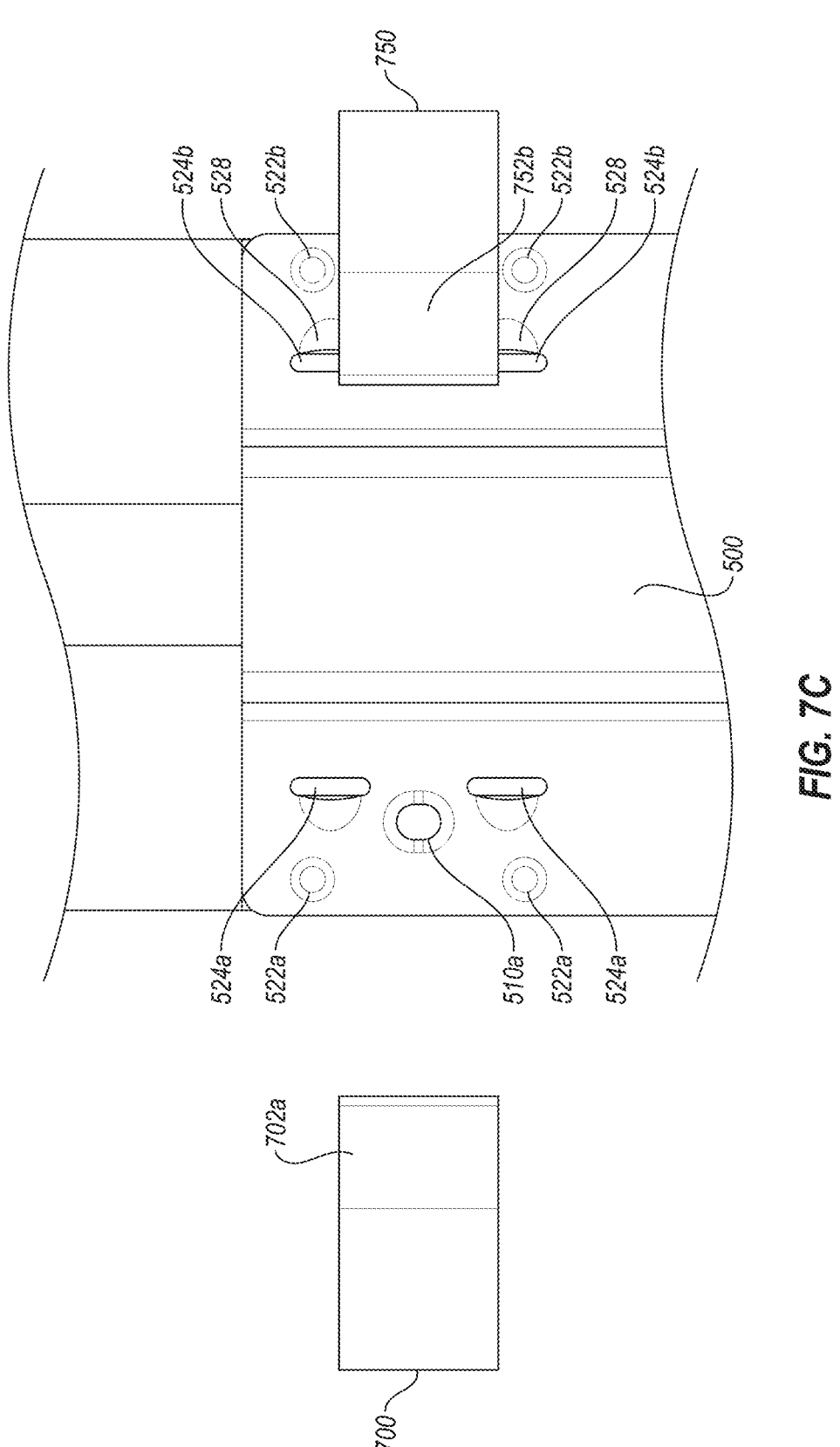

FIGS. 7A-7C illustrate two clips 700 and their interactions with components shown in FIG. 4. As shown in FIG. 7A, the clips 700 include a top arm 702a, a bottom arm 702b, and a connecting body 704. A slot 706 is defined between the top arm 702a and the bottom arm 702b. Retention tabs 708a and 708b are positioned at the ends of the top and/or bottom arms 702a and 702b that extend inward into the slot 706. Recesses 710a and 710b are positioned directly behind the retention tabs 708a and 708b.

FIGS. 7B and 7C illustrate side and bottom views, respectively, of the PV modules 402a and 402b positioned on the mounting rail 500 with one clip 700 shown just prior to installation and another clip 700 shown after installation. To install the clip 700, it is moved in the direction shown by the arrows so that the first frame rail flange 408a and the first mounting rail flange 502a are positioned within the slot 706. The clips 700 are reversible such that they may be installed regardless of what side of the clip 700 is on top. This reversibility feature, however, is optional. In some embodiments a clip may include a retention tab on only one side of the slot. Thus, in FIGS. 7B and 7C, because the retention tab 708b is on the bottom, it slides over the ramp portions of 528 of the longitudinal clip retention protrusions 524a and 524b. Movement of the retention tabs 708b over the longitudinal clip retention protrusions 524a and 524b may require the clip 700 to flex such that the width of the slot 706 slightly expands during installation.

Once the retention tab 708b has moved past the ramp portions 528 of the longitudinal clip retention protrusions 524a and 524b, the clip 700 and the slot 706 may return to their original shape and size. For example, as shown with the installed clip 700, retention tab 708b is resting against ridge portions 530 of the longitudinal clip retention protrusions 524b. The longitudinal clip retention protrusions 524b extend into the recess 710b, which is positioned directly behind the retention tab 708. The longitudinal clip retention protrusions 524b prevent the clip 700 from backing out and disengaging from its installed position.

During installation of the clip 700, the bottom arm 702b slides past the lateral clip retention protrusions 522b. Once installed, the lateral clip retention protrusions 522b prevent the clip 700 from moving laterally relative to the mounting rail 500, as outside surfaces of clip 700 would contact the lateral clip retention protrusions 522b.

Figure 8A:
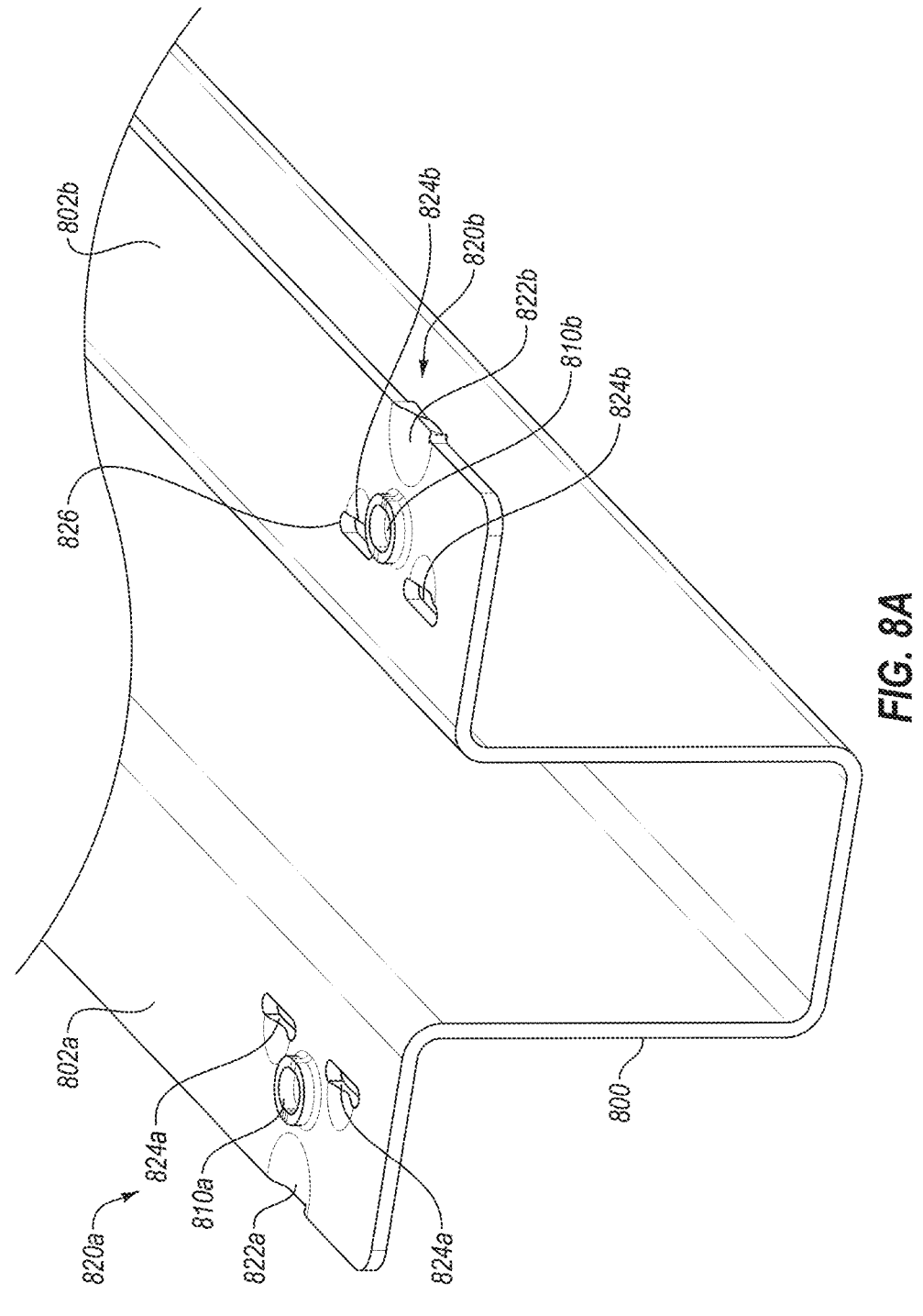
FIGS. 8A and 8B illustrate another embodiment of a mounting rail.
Figure 8B:
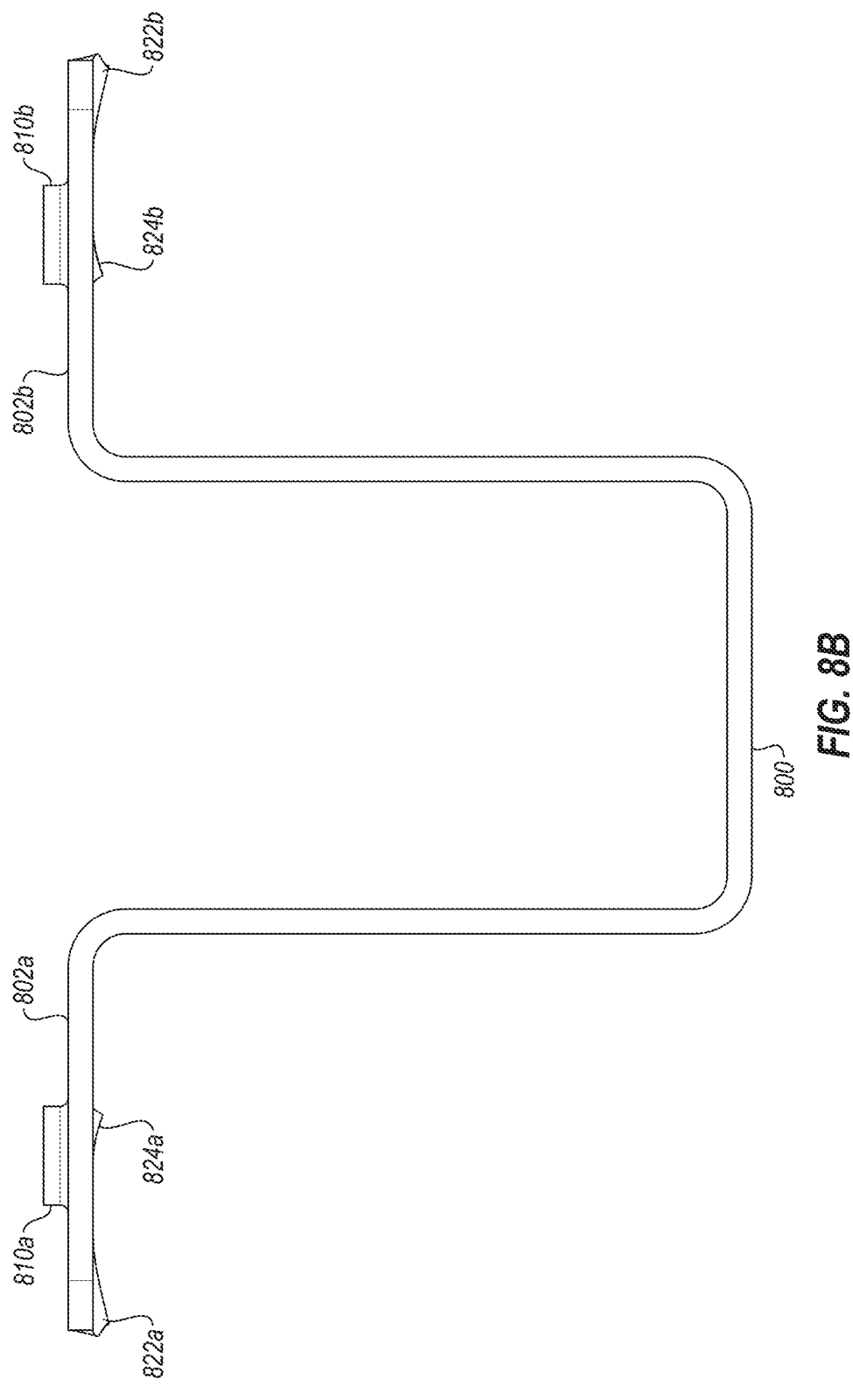

FIGS. 8A and 8B illustrate another embodiment of a mounting rail 800. Similar to the mounting rail 500, the mounting rail 800 also includes first and second mounting rail flanges 802a and 802b, clip retaining features 820a and 820b, and module locating features 810a and 810b. Each of these components are similar to the corresponding components in mounting rail 500, with the exception of the lateral clip retention protrusions 822a and 822b. The lateral clip retention protrusions 822a and 822b are configured to prevent a clip (such as the clip 700) from moving laterally relative to the mounting rail 800, as inside or interior surfaces of the clip would contact the lateral clip retention protrusions 822a and 822b. While the mounting rail 800 only includes a single lateral clip retention protrusions 822a and 822b on each of the first and second mounting rail flanges 802a and 802b, in other embodiments may include multiple lateral clip retention protrusions. In addition, while the lateral clip protrusions 822*a* and 822*b* have a generally semi-circular shape, in other embodiments they could be rectangular, triangular, or any other shape. Further, while the lateral clip protrusions 822*a* and 822*b* are shown as depressions that do not break the rail material to form a flange, in other embodiments they may be formed in a way that pierces through the rail material.

Figures 9A, 9B:
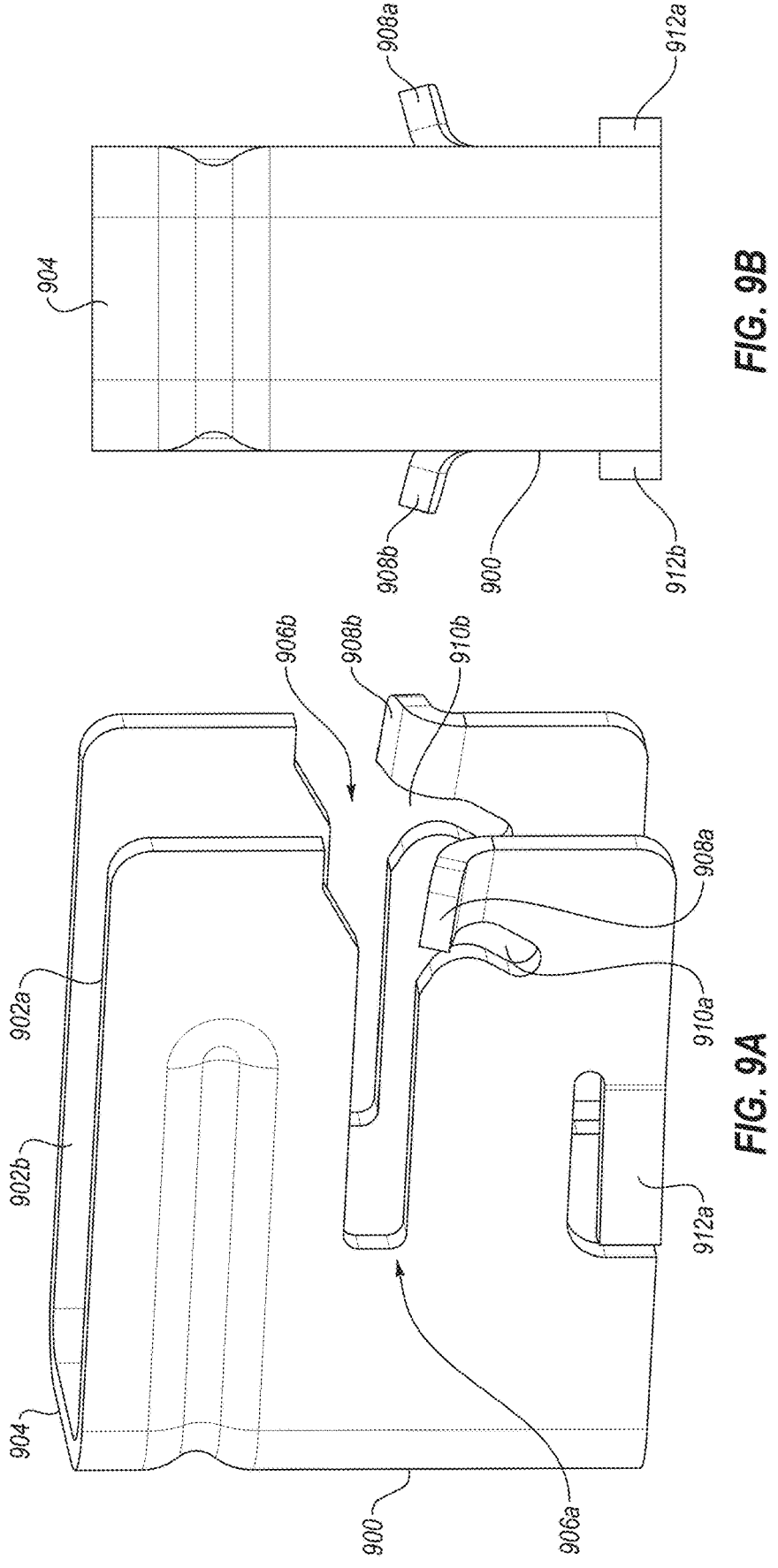
FIGS. 9A and 9B illustrate another embodiment of a clip.

FIGS. 9A and 9B illustrate another embodiment of a clip 900. The clip 900 includes a first arm 902*a*, a second arm 902*b*, and a connecting body 904. A first slot 906*a* is defined by the first arm 902*a*. A second slot 906*b* is defined by the second arm 902*b*. Longitudinal retention tabs 908*a* and 908*b* are positioned at the ends of the first and second arms 902*a* and 902*b* just below the first and second slots 906*a* and 906*b*. Recesses 910*a* and 910*b* are positioned directly behind the longitudinal retention tabs 908*a* and 908*b* and are configured to prevent the clip 900 from moving longitudinally relative to a mounting rail, when installed. The clip 900 also includes lateral retention tabs 912*a* and 912*b*. The lateral retention tabs 912*a* and 912*b* are positioned at the bottoms of the first and second arms 902*a* and 902*b* and are configured to prevent the clip 900 from moving laterally relative to a mounting rail, when installed. The lateral retention tables 912*a* and 912*b* may also serve as longitudinal retention tabs, which prevent the clip from moving longitudinally by interfacing with an inside of a vertical wall of a mounting rail.

Figure 10A:
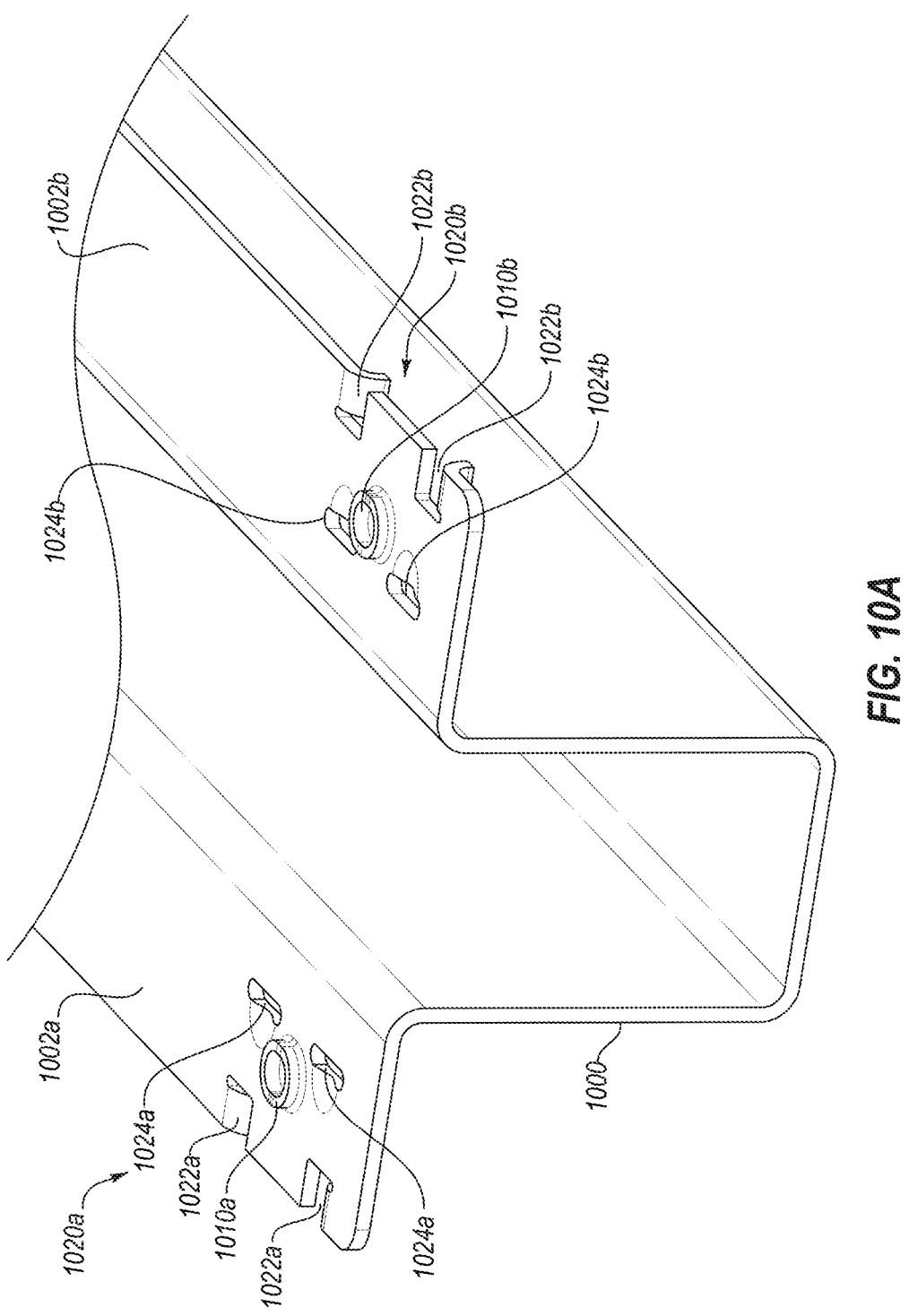
FIGS. 10A and 10B illustrate another embodiment of a mounting rail.
Figure 10B:
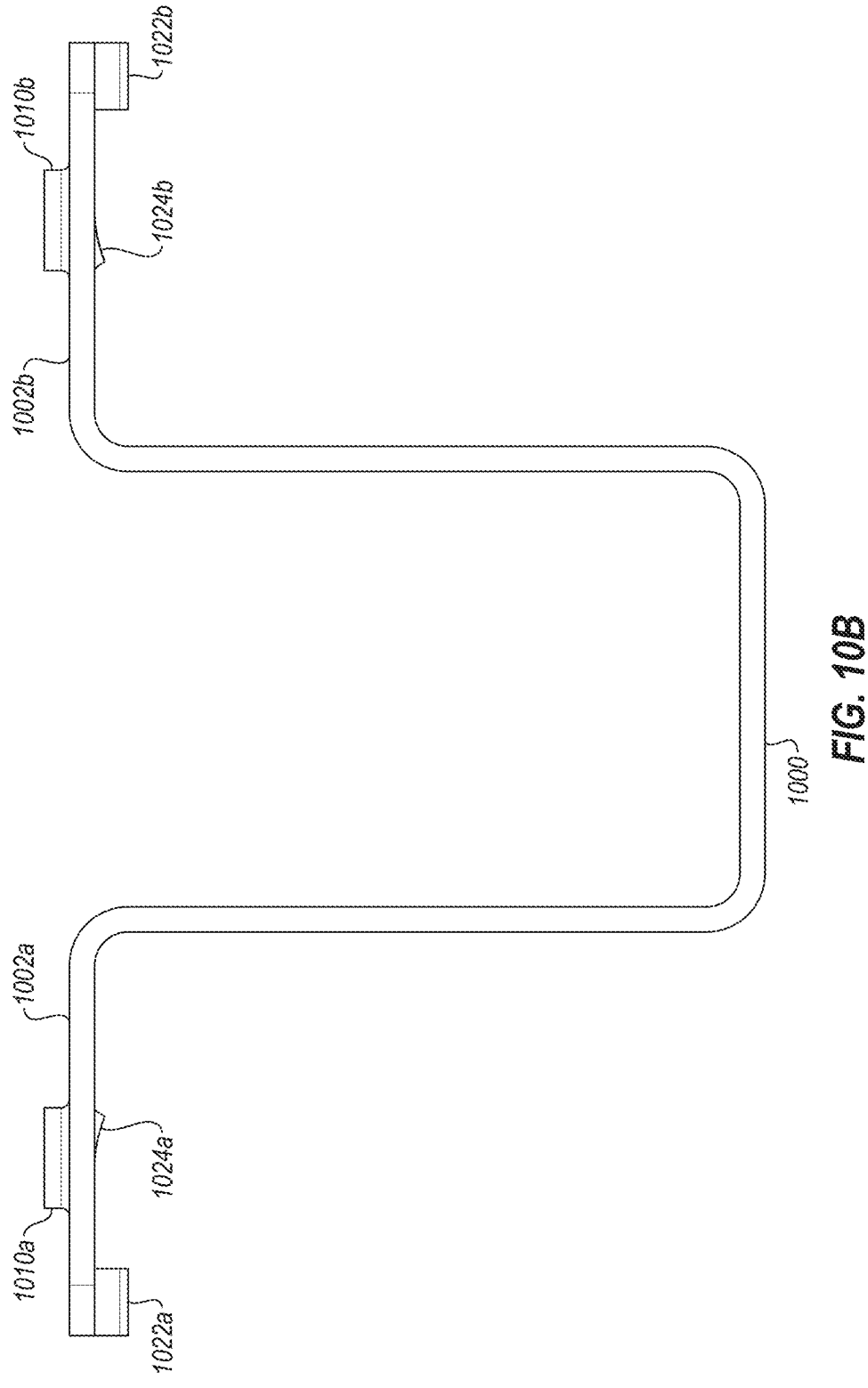

FIGS. 10A and 10B illustrate another embodiment of a mounting rail 1000. Similar to the mounting rail 500, the mounting rail 1000 also includes first and second mounting rail flanges 1002*a* and 1002*b*, clip retaining features 1020*a* and 1020*b*, and module locating features 1010*a* and 1010*b*. Each of these components are similar to the corresponding components in mounting rail 500, with the exception of the lateral clip retention protrusions 1022*a* and 1022*b*. The lateral clip retention protrusions 1022*a* and 1022*b* are cut out from edges of the first and second mounting rail flanges 1002*a* and 1002*b*. The portions that extend downward are configured to prevent a clip (such as the clip 900) from moving laterally relative to the mounting rail 1000, as outside surfaces of the clip would contact the lateral clip retention protrusions 1022*a* and 1022*b*. For example, if the mounting rail 1000 were used together with the clip 900, the lateral retention tabs 912*a* and 912*b* would be required to bend inward during installation so that the lateral retention tabs 912*a* and 912*b* could get behind the lateral clip retention protrusions 1022*a* and 1022*b*. Once installed, the lateral retention tabs 912*a* and 912*b* may go back to an original shape and be positioned behind the lateral clip retention protrusions 1022*a* and 1022*b*. While the lateral clip retention protrusions 1022*a* and 1022*b* are shown as being bent so as to interface with an outside surface of a clip, they could also be formed such that they interface with inside surfaces of the mounting clip.

Figure 11:
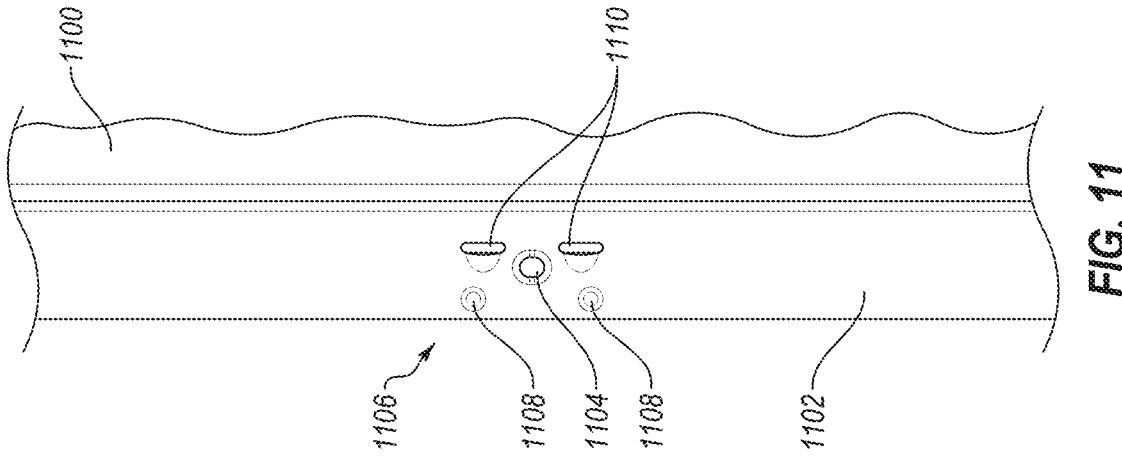
FIG. 11 illustrates an embodiment of a module frame.

In some embodiments, clip retaining features may be positioned on PV module frame rail flanges. This may be in addition to or in place of these clip retaining features on mounting rails. FIG. 11 illustrates a PV module frame 1100 having a frame rail flange 1102 that includes an aperture 1104 and a clip retaining feature 1106. The clip retaining feature 1106 includes lateral clip retention protrusions 1108 and longitudinal clip retention protrusions 1110. These lateral clip retention protrusions 1108 and longitudinal clip retention protrusions 1110 are similar to the lateral clip retention protrusions 522*a* and 522*b* and longitudinal clip retention protrusions 524*a* and 524*b* illustrated on the mounting rail 500 in FIGS. 5A-5D, except that these features protrude upward from top surface of the frame rail flange 1102.

Figure 12:
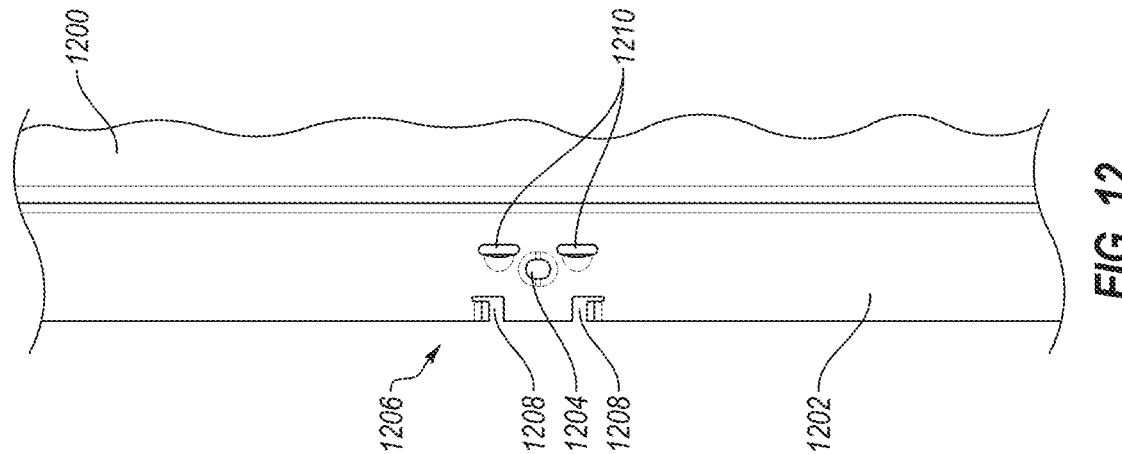
FIG. 12 illustrates another embodiment of a module frame.

FIG. 12 illustrates another PV module frame 1200 having a frame rail flange 1202 that includes an aperture 1204 and a clip retaining feature 1206. The clip retaining feature 1206 includes lateral clip retention protrusions 1208 and longitudinal clip retention protrusions 1210. These lateral clip retention protrusions 1208 and longitudinal clip retention protrusions 1210 are similar to the lateral clip retention protrusions 822*a* and 822*b* and longitudinal clip retention protrusions 824*a* and 824*b* illustrated on the mounting rail 800 in FIGS. 8A and 8B, except that these features protrude upward from top surface of the frame rail flange 1202.

Figure 13:
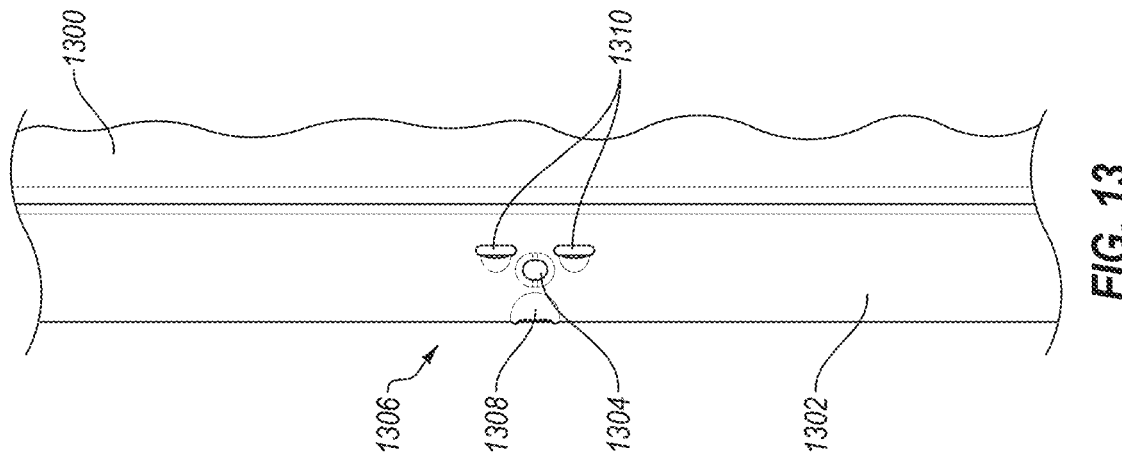
FIG. 13 illustrates yet another embodiment of a module frame.

FIG. 13 illustrates another PV module frame 1300 having a frame rail flange 1302 that includes an aperture 1304 and a clip retaining feature 1306. The clip retaining feature 1306 includes lateral clip retention protrusions 1308 and longitudinal clip retention protrusions 1310. These lateral clip retention protrusions 1308 and longitudinal clip retention protrusions 1310 are similar to the lateral clip retention protrusions 1022*a* and 1022*b* and longitudinal clip retention protrusions 1024*a* and 1024*b* illustrated on the mounting rail 1000 in FIGS. 10A and 10B, except that these features protrude upward from top surface of the frame rail flange 1302.

What is claimed is:

1. A clip for attaching a frame rail to a mounting rail in a photovoltaic (PV) module system, comprising:
    a first arm including a proximal end and a distal end and defining a first slot portion;
    a second arm including a proximal end and a distal end and defining a second slot portion; and
    a connecting body that connects the proximal end of the first arm with the proximal end of the second arm and defines a third slot portion, wherein:
        the first, second, and third slot portions together define a slot with a perimeter that is fully enclosed by the first arm, the second arm, and the connecting body, the slot being configured to receive a mounting rail flange and a frame rail flange; and
        one or more of the first arm, the second arm, or the connecting body is configured to elastically deform to decrease a distance between the distal end of the first arm and the distal end of the second arm relative to each other and apply a spring force to the first arm and the second arm away from a longitudinal axis of the clip when the clip is in a compressed state.

2. The clip of claim 1, wherein:
    the first slot portion defined by the first arm includes a first center line and the second slot portion defined by the second arm includes a second center line, the first center line extending from the connecting body at an angle (β) relative to the second center line extending from the connecting body to allow the clip, in an engaged state, to provide a spring force to the mounting rail flange and the frame rail flange.

3. The clip of claim 2, wherein the angle beta (β) is determined based on a combined thickness of the mounting rail flange and the frame rail flange.

4. The clip of claim 1, wherein the first arm further includes a first retention recess that is configured to interface with a first clip retention tab on the mounting rail and the second arm further includes a second retention recess that is configured to interface with a second clip retention tab on the mounting rail.

5. The clip of claim 4, wherein a first distance between the first retention recess and the second retention recess is greater in an unengaged state than a second distance between the first retention recess and the second retention recess in the engaged state.

6. The clip of claim 4, wherein the slot on the first arm extends partially into the first retention recess and the slot on the second arm extends partially into the second retention recess.

7. The clip of claim 1, wherein the slot at the connecting body includes a portion that is larger than the slot defined on either the first arm or the second arm, the larger portion of the slot configured to allow the clip to be positioned for installation.

8. The clip of claim 1, wherein the distal ends of the first arm and the second arm respectively turn outward relative to each other.

9. A clip for attaching a frame rail to a mounting rail in a photovoltaic (PV) module system, comprising:
- a first arm including a proximal end and a distal end and defining a first slot portion;
- a second arm including a proximal end and a distal end and defining a second slot portion; and
- a connecting body that connects the proximal end of the first arm with the proximal end of the second arm and defines a third slot portion, wherein:

the first, second, and third slot portions together define a slot that is fully enclosed by the first arm, the second arm, and the connecting body, the slot being configured to receive a mounting rail flange and a frame rail flange;

the first slot portion includes a first center line and the second slot portion includes a second center line, wherein the first center line extends from the connecting body at an angle ($\beta$) relative to the second center line extending from the connecting body to allow the clip, in an engaged state, to provide a spring force to the mounting rail flange and the frame rail flange.

10. The clip of claim 9, wherein the angle ($\beta$) is determined based on a combined thickness of the mounting rail flange and the frame rail flange.

11. The clip of claim 9, wherein the third slot portion is larger than each of the first and second slot portions the third slot portion being configured to allow the clip to be positioned for installation.

12. The clip of claim 9, wherein the first arm further includes a first retention recess and the second arm further includes a second retention recess that is configured to interface with a second clip retention tab.

\* \* \* \* \*